(12) United States Patent
Washiro

(10) Patent No.: US 9,419,688 B2
(45) Date of Patent: Aug. 16, 2016

(54) TRANSMISSION DEVICE, RECEPTION DEVICE, AND COMMUNICATION SYSTEM

(75) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 993 days.

(21) Appl. No.: 13/576,334

(22) PCT Filed: Aug. 15, 2011

(86) PCT No.: PCT/JP2011/068504
§ 371 (c)(1),
(2), (4) Date: Jul. 31, 2012

(87) PCT Pub. No.: WO2012/026353
PCT Pub. Date: Mar. 1, 2012

(65) Prior Publication Data
US 2012/0300860 A1    Nov. 29, 2012

(30) Foreign Application Priority Data

Aug. 24, 2010   (JP) .................................. 2010-187247

(51) Int. Cl.
*H02J 1/00*          (2006.01)
*H04B 5/00*          (2006.01)
*H04B 3/54*          (2006.01)

(52) U.S. Cl.
CPC ................ *H04B 5/0081* (2013.01); *H04B 3/54* (2013.01); *H04B 2203/5416* (2013.01)

(58) Field of Classification Search
CPC . H04B 5/0081; H04B 3/54; H04B 2203/5416
USPC .......................................................... 307/1
See application file for complete search history.

(56) References Cited

U.S. PATENT DOCUMENTS

| 5,995,813 A * | 11/1999 | Ishikura ................ H04W 52/52 455/127.2 |
| 8,339,278 B2 * | 12/2012 | Sakamoto .............. G08C 17/02 340/870.07 |
| 2002/0080010 A1 * | 6/2002 | Zhang ................... H04B 3/542 375/257 |
| 2005/0077356 A1 | 4/2005 | Takayama et al. |
| 2005/0083925 A1 * | 4/2005 | Bonicatto ................ H04B 3/54 370/389 |
| 2006/0145535 A1 * | 7/2006 | Kaneko ............................. 307/1 |
| 2007/0121676 A1 * | 5/2007 | Koga et al. .................... 370/482 |
| 2008/0061733 A1 * | 3/2008 | Toya ....................... H02J 7/025 320/103 |

(Continued)

FOREIGN PATENT DOCUMENTS

| CN | 1692566 | 11/2005 |
| JP | 57-132460 | 8/1982 |

(Continued)

OTHER PUBLICATIONS

Japanese Office Action issued on Dec. 11 2012 for corresponding Japanese Appln. No. 2012-530626.

(Continued)

*Primary Examiner* — Jared Fureman
*Assistant Examiner* — Alfonso Perez Borroto
(74) *Attorney, Agent, or Firm* — K&L Gates LLP

(57) ABSTRACT

Provided is a transmission device including a terminal connected electrically to a terminal of another device, and a transmission unit configured to transmit information through the terminal by performing load modulation according to contact between the terminal and the terminal of the other device.

25 Claims, 12 Drawing Sheets

(56) References Cited

U.S. PATENT DOCUMENTS

| | | | |
|---|---|---|---|
| 2010/0109443 A1* | 5/2010 | Cook et al. ................ | 307/104 |
| 2010/0133900 A1* | 6/2010 | King ................ | B60L 11/1816 |
| | | | 307/9.1 |
| 2010/0150556 A1* | 6/2010 | Soto ................ | H04B 3/54 |
| | | | 370/389 |
| 2011/0022222 A1 | 1/2011 | Tonegawa | |
| 2011/0289336 A1* | 11/2011 | Yu ................ | 713/340 |
| 2012/0091790 A1* | 4/2012 | Utsumi ................ | 307/9.1 |

FOREIGN PATENT DOCUMENTS

| | | |
|---|---|---|
| JP | 10-084303 | 3/1998 |
| JP | 10-126319 | 5/1998 |
| JP | 11-288315 | 10/1999 |
| JP | 2003-078458 | 3/2003 |
| JP | 2003-110471 | 4/2003 |
| JP | 2006-109022 | 4/2006 |
| JP | 2006-279650 | 10/2006 |
| JP | 2007-096752 | 4/2007 |
| JP | 2007-267057 | 10/2007 |
| JP | 2008-182626 | 8/2008 |
| JP | 2009-094768 | 4/2009 |
| JP | 2009-164924 | 7/2009 |
| JP | 2009-171700 | 7/2009 |
| JP | 2009-302615 | 12/2009 |
| JP | 2010-092232 | 4/2010 |

OTHER PUBLICATIONS

Chinese Office Action issued Mar. 5, 2014 for corresponding Chinese Appln. No. 201180039799.

Chinese Office Action issued Sep. 30, 2014, for corresponding Chinese Appln. No. 201180039799.

* cited by examiner

TRANSMISSION DEVICE, RECEPTION DEVICE, AND COMMUNICATION SYSTEM

CROSS REFERENCES TO RELATED APPLICATIONS

The present application is a national stage of International Application No. PCT/JP2011/068504 filed on Aug. 15, 2011 and claims priority to Japanese Patent Application No. 2010-187247 filed on Aug. 24, 2010, the disclosure of which is incorporated herein by reference.

BACKGROUND

The present disclosure relates to a transmission device, a reception device, and a communication system.

Recently, with an increase in attention to social environments, a management device capable of controlling the supply of power to an electronic device (for example, an intelligent tap, a smart tap, or the like) connected by a power line (for example, control for selectively stopping the supply of power to a device that need not be supplied with power, or the like) has emerged. The above management device uses, for example, technology for using a power line, which is called Power Line Communication (PLC), as a communication line. Technology for performing communication through a power line using PLC may be, for example, Patent Literature 1.

CITATION LIST

Patent Literature

Patent Literature 1: JP 2003-110471A

SUMMARY

Technical Problem

However, if existing PLC technology is used to perform wired communication, a device performing communication may need to have, for example, a communication device that includes a relatively large circuit called a PLC modem. Therefore, if existing PLC is used to perform wired communication, there is a fear that the cost of a device performing communication may increase, and there is also a fear that the size of a device performing communication may be restricted. In addition, if existing PLC is used to perform wired communication, when power is not supplied to a device performing communication (for example, when the device is in a dormant state such as a state in which a main power supply is off), communication cannot be performed.

Therefore, there is a demand for a new wired communication method.

The present disclosure proposes a new and improved transmission device, reception device, and communication system that can perform wired communication.

Solution to Problem

According to the present disclosure, for example, there is provided a transmission device including a terminal connected electrically to a terminal of another device, and a transmission unit configured to transmit information through the terminal by performing a load modulation according to a contact between the terminal and the terminal of the other device.

Also, the transmission unit may transmit the information regardless of whether a signal indicating an instruction of a user is input after contact is made between the terminal and the terminal of the other device.

Also, the transmission unit may receive power supply through the terminal by the contact between the terminal and the terminal of the other device.

Also, the transmission unit may receive a high frequency signal from the terminal as drive power.

Also, the transmission device may further include a drive unit configured to drive by receiving a direct current or an alternating current having a lower frequency than the high frequency signal from the terminal as the drive power, wherein the drive unit may receive the direct current or the alternating current according to a result of an authentication process executed in the other device using the information.

Also, the high frequency signal may be a frequency used in Radio Frequency IDentification (RFID).

Also, the frequency may include a frequency used in contactless communication.

Also, the frequency may include at least one of 130 to 135 kHz, 13.56 MHz, 56 MHz, 433 MHz, 954.2 MHz, 954.8 MHz, 2441.75 MHz, or 2448.875 MHz.

Also, the transmission device may include a filter configured to pass the high frequency signal and block the direct current or the alternating current.

Also, the transmission device may include at least two terminals, and the other device may include at least two terminals.

Also, the terminal of the transmission device may be a terminal provided at a plug, and the terminal of the other device may be a terminal provided at an outlet.

Also, the transmission device may include a display unit configured to display an image or a character.

Also, the transmission device may be a vehicle that charges a built-in battery by receiving power supply, and rotates a wheel using power of the built-in battery.

Also, according to the present disclosure, there is provided a reception device including a high frequency signal output unit configured to output a high frequency signal, and a reception unit configured to receive information transmitted from a transmission device by load modulation when a terminal of the transmission device and a terminal of the reception device are in contact with each other.

Also, the high frequency signal may be output when the contact between the terminal of the transmission device and the terminal of the reception device is detected.

Also, the high frequency signal output unit may output the high frequency signal repeatedly.

Also, the high frequency signal output unit may superimpose the high frequency signal having a higher frequency than a direct current or an alternating current flowing through a power line, on the direct current or the alternating current.

Also, the high frequency signal may be a frequency used in Radio Frequency IDentification (RFID).

Also, the frequency may include a frequency used in contactless communication.

Also, the frequency may include at least one of 130 to 135 kHz, 13.56 MHz, 56 MHz, 433 MHz, 954.2 MHz, 954.8 MHz, 2441.75 MHz, or 2448.875 MHz.

Also, the reception device may further include a filter configured to pass the high frequency signal and block the alternating current.

Also, the terminal of the transmission device may be a terminal provided at a plug, and the terminal of the reception device may be a terminal provided at an outlet.

Also, the transmission device may include at least two terminals, and the reception device may include at least two terminals.

Also, the transmission device may be identified based on the information transmitted from the transmission device by the load modulation.

Also, the reception device may include a display unit configured to display an image and/or a character.

Also, the reception device may be a vehicle.

Also, according to the present disclosure, for example, there is provided a communication system including a transmission device and a reception device, wherein the transmission device includes a terminal connected electrically to a terminal of the reception device, and a transmission unit configured to transmit information through the terminal by performing load modulation according to contact between the terminal and the terminal of the reception device, and wherein the reception unit includes a high frequency signal output unit configured to output a high frequency signal, and a reception unit configured to receive the information transmitted from the transmission device by the load modulation when the terminal of the transmission device and the terminal of the reception device are in contact with each other.

Also, according to the present disclosure, for example, there is provided a management device including a connection unit configured to connect an external power line connected to an electronic device and an internal power line in the management device, a management side power line communication unit configured to perform communication with the electronic device by a high frequency signal, which is superimposed on a power line corresponding to a connection of the internal power line and the external power line and has a frequency higher than a frequency of power supplied through the power line to the electronic device, through the power line, a communication filter connected between the management side power line communication unit and the internal power line and configured to block at least a signal of the frequency of the power among signals transmitted from the internal power line and pass the high frequency signal, and a management unit configured to identify the electronic device connected to the external power line connected to the connection unit, based on identification information that is received by the management side power line communication unit through the power line and is used to identify the electronic device, wherein the power line communication unit transmits a first high frequency signal, which is a high frequency signal for causing the identification information to be transmitted to the electronic device, through the power line, and receives the identification information transmitted by load modulation as the high frequency signal from the electronic device driven by obtaining power from the first high frequency signal.

By such a configuration, for example, an electronic device connected by a power line can be identified.

Also, the management side power line communication unit may transmit a second high frequency signal, which is the high frequency signal for causing a predetermined process to be performed by the electronic device connected to the external power line, through the power line, and receive a response signal with respect to the second high frequency signal transmitted by load modulation as the high frequency signal from the electronic device driven by obtaining power from the second high frequency signal.

Also, the management device may further include a communication unit configured to perform communication with an external device, wherein the management unit may transmit the second high frequency signal according to a result of the communication with the external device to the management side power line communication unit.

Also, the management device may further include a power consumption measurement unit configured to measure a power consumption of the electronic device connected to the external power line connected to the connection unit, wherein the management unit may store information about the power consumption measured by the power consumption measurement unit, in association with connection state information indicating the electronic device connected to the external power line connected to the connection unit, corresponding to the electronic device measured by the power consumption measurement unit.

Also, the management device may further include a power supply unit configured to selectively connect an internal power supply or an external power supply and the internal power line and selectively supply power to the internal power line, based on a control signal transmitted from the management unit.

Also, the connection unit may detect a change in a connection state of the external power line, and the power line communication unit may transmit the first high frequency signal through the power line based on a detection result in the connection unit.

Also, the management device may include the connection unit in a plural number, wherein the management side power line communication unit may transmit the first high frequency signal through each of the power lines corresponding to the plurality of connection units when a connection of the external power line is detected in any one of the plurality of connection units, and wherein the management unit may identify the electronic device connected to the external power line connected to each of the plurality of connection units, based on connection state information indicating the electronic device connected to each of the external power lines connected to the plurality of connection units, connection unit identification information indicating the connection unit in which a change in the connection state of the external power line is detected, and the identification information received by the management side power line communication unit, before transmission of the first high frequency signal, and store information about the identified electronic device as the connection state information after transmission of the first high frequency signal.

Also, the management unit may identify an electronic device whose connection state is changed by comparing a list of electronic devices indicated by connection state information before transmission of the first high frequency signal with a list of electronic devices based on the identification information received by the management side power line communication unit, and may identify the connection unit in which a change in the connection state of the external power line is detected, based on the connection unit identification information.

Also, the management device may further include a switch unit configured to switch between a first connection state of electrically connecting the management side communication unit and each of the external power lines connected to the plurality of connection units and a second connection state of electrically connecting the management side communication unit and any one of the external power lines connected to the plurality of connection units, wherein the switch unit may selectively switch the first connection state and the second connection state based on a switch signal transmitted from the management unit.

Also, the management device may further include an operation unit operable by a user, wherein the management unit may transmit the switch signal, which is transmitted from the operation unit and is based on an operation signal according to a user operation for switching from the first connection state to the second connection state, to the switch unit.

Also, the management device may further include a notification unit configured to notify an identification result of the electronic device connected to the external power line connected to each of the plurality of connection units in the management unit, to a user with respect to each of the plurality of connection units.

Also, the management device may further include a communication unit configured to perform communication with an external device, wherein the management unit may transmit information about the identified electronic device to the external device through the communication unit.

Also, according to the present disclosure, for example, there is provided an electronic device including a device side power line communication unit configured to perform communication with an external device by a high frequency signal, which is superimposed on a power line and has a frequency higher than a frequency of power supplied through the power line, through the power line, and a communication filter connected between the power line and the device side power line communication unit and configured to block at least a signal of the frequency of the power among signals transmitted from the power line and pass the high frequency signal, wherein the device side power line communication unit is driven by obtaining power from a first high frequency signal, which is the high frequency signal transmitted from the external device to request transmission of stored identification information, and transmits stored identification information as the high frequency signal by load modulation according to the first high frequency signal.

By such a configuration, for example, a management system capable of identifying an electronic device connected by a power line can be realized.

Also, the device side power line communication unit may be driven by obtaining power from a second high frequency signal, which is the high frequency signal transmitted from the external device to request execution of a predetermined process, perform a process according to the second high frequency signal, and transmit a response signal based on the process according to the second high frequency signal by load modulation as the high frequency signal.

Also, according to the present disclosure, for example, there is provided a management system including an electronic device and a management device configured to communicate with the electronic device through a power line corresponding to a connection of an external power line connected to the electronic device and an internal power line in the management device, wherein the management device includes a connection unit configured to connect the external power line and the internal power line, a management side power line communication unit configured to perform communication with the electronic device by a high frequency signal, which is superimposed on the power line and has a frequency higher than a frequency of power supplied through the power line to the electronic device, through the power line, a management side communication filter connected between the management side power line communication unit and the internal power line and configured to block at least a signal of the frequency of the power among signals transmitted from the internal power line and pass the high frequency signal, and a management unit configured to identify the electronic device connected to the external power line connected to the connection unit, based on identification information that is received by the management side power line communication unit through the power line and is used to identify the electronic device, wherein the electronic device includes a device side power line communication unit configured to perform communication with the management device by the high frequency signal through the power line, and a device side communication filter connected between the power line and the device side power line communication unit and configured to block at least a signal of the frequency of the power among signals transmitted from the power line and pass the high frequency signal, wherein the management side power line communication unit of the management device transmits a first high frequency signal, which is the high frequency signal for causing the identification information to be transmitted to the electronic device, through the power line, and receives the identification information transmitted by load modulation as the high frequency signal from the electronic device, and wherein the device side power line communication unit of the electronic device is driven by obtaining power from the first high frequency signal transmitted from the management device, and transmits stored identification information as the high frequency signal by load modulation according to the first high frequency signal.

By such a configuration, for example, a management system capable of identifying an electronic device connected by a power line is realized.

Advantageous Effects of Invention

According to the present disclosure, new and improved wired communication can be performed.

Additional features and advantages are described herein, and will be apparent from the following Detailed Description and the figures.

DETAILED DESCRIPTION

Figure 1:
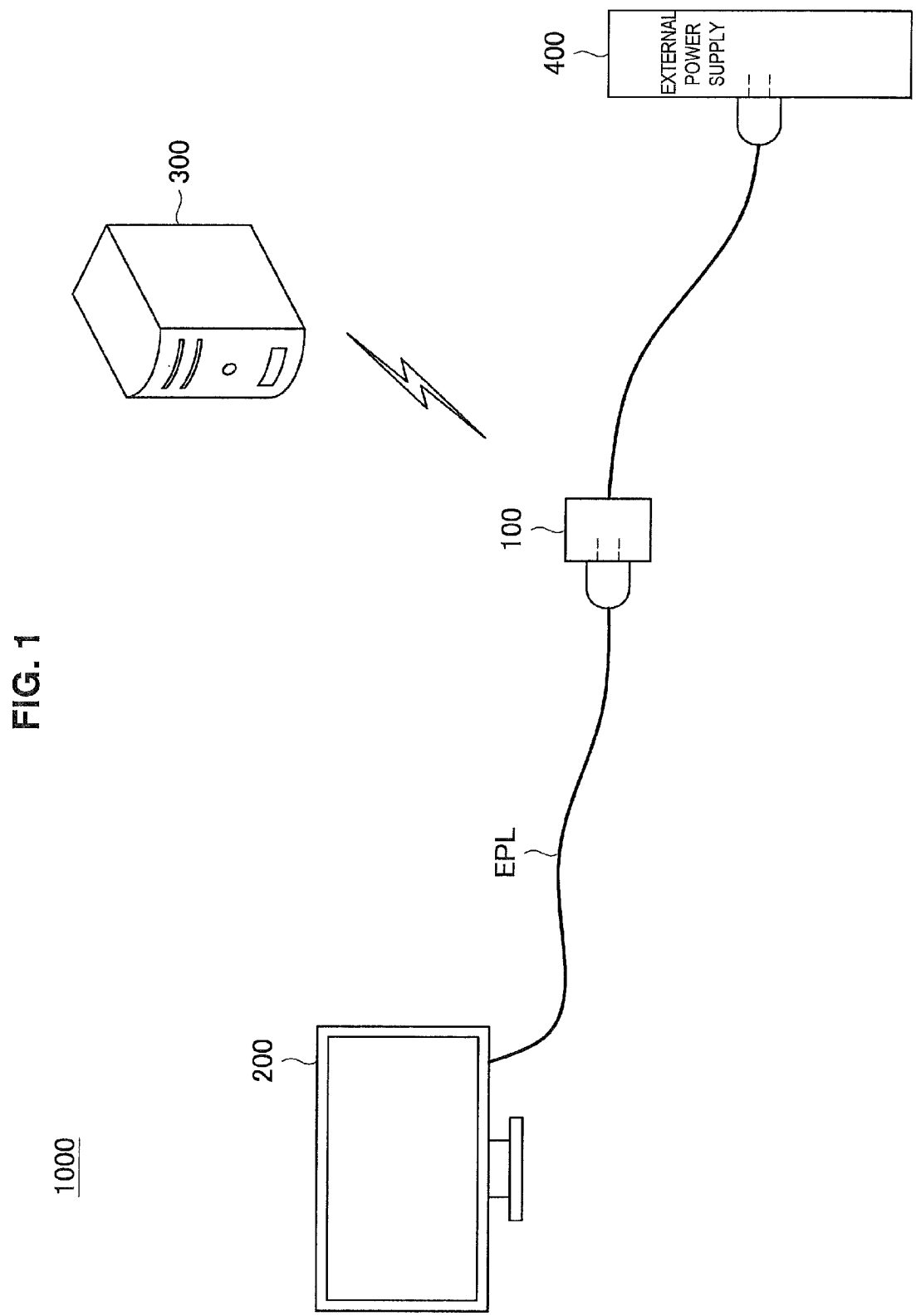
FIG. 1 is an illustration diagram illustrating an example of the configuration of a management system according to the present embodiment.

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Also, hereinafter, descriptions will be made in the following order.

1. Communication method according to present embodiment
2. Management method according to present embodiment
3. Management system according to present embodiment
4. Program according to present embodiment (Communication Method According to Present Embodiment)

As described above, for example, if existing PLC is used to perform wired communication, there is a fear that the cost of a device performing communication may increase, and there is also a fear that the size of a device performing communication may be restricted. In addition, if existing PLC is used to perform wired communication, when power is not supplied to a device performing communication (for example, when the device is in a dormant state such as a state in which a main power supply is off), communication cannot be performed.

Therefore, in a communication system according to the present embodiment, wireless communication technology such as Near Field Communication (NFC)-based communication technology, Radio Frequency Identification (RFID) technology, or the like is applied to wired communication. Herein, examples of the wired communication according to the present embodiment include communication performed while terminals of respective devices contact each other (what is called contact communication), and communication performed while terminals of respective devices are connected by wire.

For example, in a communication system which includes a transmission device and a reception device and in which terminals of the respective devices are electrically connected, the transmission device transmits information through the terminal of the transmission device by performing load modulation according to contact between the terminal of the transmission device and the terminal of the reception device. Also, when the terminal of the transmission device and the terminal of the reception device are in contact with each other (are electrically connected to each other), the reception device receives the information transmitted from the transmission device by load modulation. Herein, "the electrical connection between the terminal of the transmission device and the terminal of the reception device" according to the present embodiment means, for example, the contact between the terminals of the respective devices, or the connection between the terminals of the respective devices by wire.

Herein, the terminal of the transmission device according to the present embodiment may be, for example, a terminal provided at a plug, and the terminal of the reception device (another device) according to the present embodiment may be, for example, a terminal provided at an outlet. Also, it is needless to say that the terminal of the transmission device and the terminal of the reception device according to the present embodiment are not limited to the above. Also, it is preferable that the transmission device according to the present embodiment include at least two terminals, and the reception device (another device) according to the present embodiment include at least two terminals.

Also, the reception device according to the present embodiment may include a high frequency signal output unit configured to output a high frequency signal, and may transmit a high frequency signal to a reception device. That is, the reception device according to the present embodiment may have a so-called reader/writer function, and may function as a transmission device. As for the reception device according to the present embodiment, the reception device transmits a high frequency signal, for example, according to an electrical connection between the terminal of the transmission device and the terminal of the reception device. Herein, the high frequency signal according to the present embodiment may be, for example, a signal of a frequency used in RFID, or a signal of a frequency used in contactless communication. The frequency of the high frequency signal may include, for example, 130 to 135 kHz, 13.56 MHz, 56 MHz, 433 MHz, 954.2 MHz, 954.8 MHz, 2441.75 MHz, and 2448.875 MHz; however, the frequency of the high frequency signal according to the present embodiment is not limited thereto.

The reception device according to the present embodiment transmits a high frequency signal, for example, by detecting an electrical connection between the terminal of the transmission device and the terminal of the reception device. A method of detecting an electrical connection between the terminal of the transmission device and the terminal of the reception device may be, for example, to provide a contact sensor at a terminal portion of the reception device; however, the detection method according to the present embodiment is not limited thereto. Also, the reception device according to the present embodiment may repeatedly transmit a high frequency signal, for example, when detecting an electrical connection between the terminal of the transmission device and the terminal of the reception device, or regardless of the detection result of an electrical connection between the terminal of the transmission device and the terminal of the reception device (what is called polling).

Also, when the reception device according to the present embodiment functions as a transmission device, the transmission device according to the present embodiment functions as a reception device that receives a high frequency signal transmitted by the reception device according to the present embodiment.

Since a communication device using wireless communication technology such as NFC-based communication technology, RFID technology, or the like has a much smaller circuit size than an existing PLC modem, it can be scaled down to, for example, a size of an Integrated Circuit (IC) chip. Also, since devices capable of performing communication using wireless communication technology such as NFC-based communication technology, or the like (such as, for example, a portable phone mounted with an IC card or an IC chip) are becoming popular, a communication device using wireless communication technology such as NFC-based communication technology, RFID technology, or the like is less expensive than an existing PLC modem.

In addition, by applying wireless communication technology such as NFC-based communication technology, RFID technology, or the like to wired communication, the transmission device according to the present embodiment can be driven by obtaining power from a high frequency signal received through the terminal, and can transmit stored information by performing load modulation. That is, in the communication system according to the present embodiment, the reception device transmits a high frequency signal according to an electrical connection between the terminal of the transmission device and the terminal of the reception device to supply power to the transmission device, and the transmission device transmits stored information by the supplied power. Accordingly, the reception device according to the present embodiment can perform wired communication, even without having a separate power supply circuit for performing communication. Also, for example, even when a signal according to a user operation (signal indicating a user instruction) is not input, the reception device according to the present embodiment can transmit stored information by performing load modulation.

Therefore, as compared to, for example, the case of using wired communication of the related art such as an existing PLC, wired communication capable of reducing a cost, alleviating the restriction of the size of a communication device, and reducing power consumption, or the like is realized using wireless communication technology such as NFC-based communication technology, RFID technology, or the like.

Also, a communication method according to the present embodiment may be applied to, for example, communication between devices connected by two or more signal lines. Herein, the signal line according to the present embodiment may be, for example, a signal line dedicated to communication; however, the signal line according to the present embodiment is not limited thereto. For example, the signal line according to the present embodiment may be a power line through which a direct current or an alternating current having a lower frequency (for example, 50 [Hz] or 60 [Hz]) than the high frequency signal flows.

When the communication method according to the present embodiment is applied to the communication using a power line, the reception device according to the present embodiment transmits a high frequency signal, for example, by superimposing the high frequency signal on a direct current or an alternating current having a lower frequency than the high frequency signal, or without superimposing the high frequency signal on the direct current or the alternating current. When the communication method according to the present embodiment is applied to the communication using a power line, each of the transmission device and the reception device according to the present embodiment includes, for example, a filter that passes a high frequency signal and blocks an alternating current. An example of a configuration of the filter according to the present embodiment will be described later.

Also, for example, by performing an authentication process using information transmitted from the transmission device by load modulation, the reception device according to the present embodiment identifies the transmission device that has transmitted the information. When the transmission device is normally identified, a direct current or an alternating current may be supplied to the transmission device.

Hereinafter, assuming that the communication system according to the present embodiment is a system performing communication through a power line, a management method realized by applying the communication method according to the present embodiment, and a process according to the communication method according to the present embodiment will be described.

(Management Method According to Present Embodiment)
[Problems that May Occur in the Related Art]

In a management device capable of controlling the supply of power to an electronic device connected by a power line, such as an intelligent tap, a smart tap, or the like, for example, in order to perform more favorable power supply control, it is necessary to identify which electronic device is connected by a power line. Also, Patent Literature 1 may be taken as an example of the technology for identifying an electronic device connected by a power line using power line communication.

For example, a management device (hereinafter referred to as a management device of the related art) using the related art for identifying an electronic device connected by a power line using power line communication as disclosed in Patent Literature 1 (hereinafter referred to simply as the related art) uses an existing PLC to acquire an ID from an electronic device connected by a power line. Then, the management device of the related art associates the ID acquired from the electronic device through the power line with a connection port connected by the power line (for example, an inlet; an example of the terminal and a connection unit according to the present embodiment that will be described later). Accordingly, when the related art is used, it may be possible to identify which electronic device is connected to which of the connection ports included in the management device of the related art, to some extent.

However, since the management device of the related art communicates with an electronic device connected by a power line using an existing PLC, when power is not supplied to the electronic device (for example, when the device is in a dormant state such as a state in which a main power supply is off), the management device of the related art cannot communicate with the electronic device. Also, the related art has no consideration for identifying the electronic device to which power is not supplied. Accordingly, even when there is an electronic device connected by the power line, the management device of the related art cannot recognize the electronic device if power is not supplied to the electronic device.

Therefore, even when the related art is used, an electronic device connected by a power line cannot always be identified.

Also, because the management device of the related art uses an existing PLC, the management device of the related art may have, for example, the following problems (a) and (b).

(a) There is a probability that a communication failure will occur due to a communication collision.

The existing PLC is a bus-type topology in which respective devices performing communication through a power line use the same band. Accordingly, if the existing PLC is used, when a plurality of devices are connected in the same band, there is a possibility that a communication collision will occur. Also, when a communication collision occurs, there is a fear that a communication failure may occur, for example, that communication may be impossible, or that a communication delay may occur. Herein, when a communication failure occurs as above, even when power is supplied to an electronic device connected by a power line, there is a probability that the management device of the related art will not be able to identify the electronic device.

(b) Downsizing of devices related to communication is difficult, and there is a possibility that costs will increase.

When communication is performed by the existing PLC as in the related art, both a transmission side device transmitting a signal and a reception side device receiving a signal may require a separate power supply for supplying power for use in communication in order to perform communication. Thus, an electronic device according to the related art (hereinafter referred to as an electronic device of the related art) should include a power supply circuit for supplying power for performing communication by the existing PLC. Accordingly, as the electronic device of the related art should include the power supply circuit, downsizing of the electronic device of the related art becomes more difficult, and the cost of the electronic device of the related art increases further.

Also, it is difficult to reduce the size of a communication device according to an existing PLC (for example, a PLC modem) to, for example, a size of an IC chip. In addition, since the popularization of communication devices according to an existing PLC is not currently advanced, the communication device according to the existing PLC is more expensive than, for example, an IC-chip-type communication device.

Accordingly, when the related art is used to perform communication by the existing PLC, it is difficult to reduce the size of devices related to communication. Also, when the related art is used to perform communication by the existing PLC, since the electronic device of the related art should include an expensive communication device or a separate power supply circuit, there is a fear that the cost will increase when performing communication by the existing PLC.

As above, when the related art is used, an electronic device connected by a power line cannot always be identified, and there is also a fear that the foregoing problems (a) and (b) may occur.

[Measures to Identify an Electronic Device Connected by a Power Line]

Herein, as a measure to identify an electronic device connected by a power line, for example, a user may input information indicating an electronic device connected by a power line into a management device included in a management system. In the above case, even when there is an electronic device that is not supplied with power, among the electronic devices connected by a power line, there is a possibility that the electronic device can be identified.

However, in the above case, for example, when a user has an input miss, an electronic device connected by a power line cannot always be accurately identified, and there is also a fear that the convenience of the user may be diminished.

Also, as another measure to identify an electronic device connected by a power line, for example, a current waveform, a voltage waveform, or a power waveform supplied through a power line may be interpreted and an electronic device connected by the power line may be estimated based on the interpretation result.

However, in the above case, since an electronic device connected by a power line is identified solely by estimation, the connected electronic device cannot always be identified with high accuracy. Also, in the above case, for example, when an electronic device having new waveform characteristics is connected, estimation cannot be performed, for example, if the management device is not trained accordingly. Also, when the number of electronic devices connected by a power line increases, since estimation by waveform characteristics becomes more difficult, there is a fear that estimation accuracy may be lowered. Accordingly, in the above case, an electronic device connected by a power line cannot always be accurately identified.

Also, as another measure to identify an electronic device connected by a power line, for example, a power line side plug (an example of a connection device) for connecting a power line to a management device may include an IC chip storing identification information that can be used to identify an electronic device, and an outlet (corresponding to an example of a connection unit according to the present embodiment that will be described later) may include a reader for reading the identification information from the IC chip by NFC-based contactless communication. In the above case, because the outlet acquires the identification information from the plug connected to the outlet, there is a possibility that an electronic device connected by a power line corresponding to the plug can be identified.

However, in the above case, for example, an electronic device connected by a power line through a so-called extension cord cannot be identified. Also, in the above case, since the reader included in the outlet acquires identification information from the plug by contactless communication, for example, multiple identification information may be acquired from a plurality of adjacent plugs, or identification information may be acquired from an adjacent plug even when a plug is not connected. Accordingly, in the above case, an electronic device connected by a power line cannot always be accurately identified.

[Summary of Management Method According to Present Embodiment]

Therefore, in a management system according to the present embodiment (an example of a communication system according to the present embodiment; hereinafter referred to as a management system 1000), by applying wireless communication technology such as NFC-based communication technology, RFID technology, or the like to wired communication technology using a power line as a communication line, identification of an electronic device connected by a power line is realized.

Figure 2:
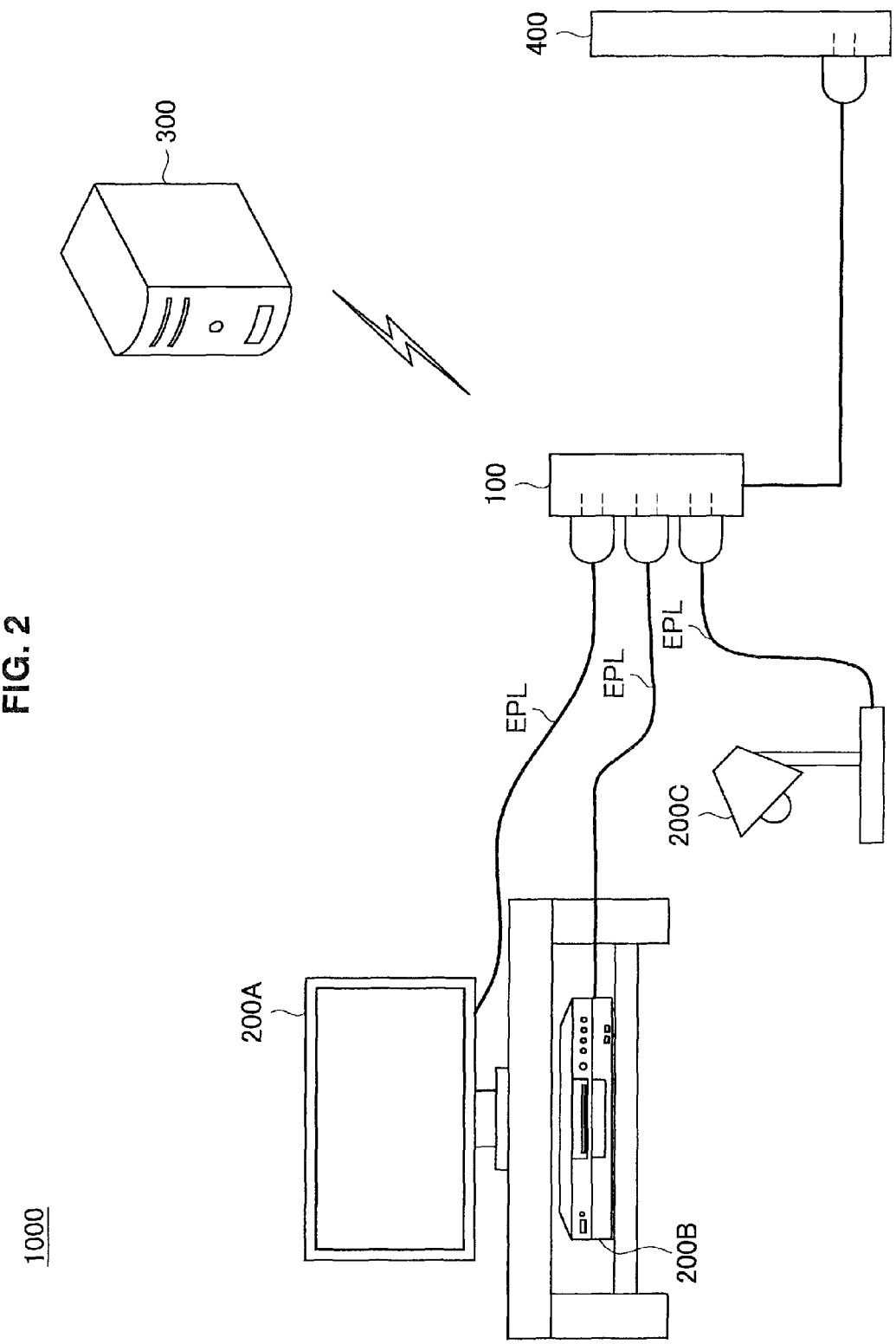
FIG. 2 is an illustration diagram illustrating an example of the configuration of a management system according to the present embodiment.

Hereinafter, by describing the summary of the management system 1000, the summary of a process according to a management method according to the present embodiment is described in more detail. FIGS. 1 and 2 are illustration diagrams illustrating examples of the configuration of the management system 1000 according to the present embodiment.

Referring to FIG. 1, the management system 1000 includes a management device 100 (corresponding to a reception device according to the present embodiment), an electronic device 200 (corresponding to a transmission device according to the present embodiment), a server 300 (corresponding to an external device), and an external power supply 400.

Herein, in FIG. 1, a power tap is illustrated as the management device 100; however, the management device 100 according to the present embodiment is not limited to a power tap. Also, in FIG. 1, a display device is illustrated as the electronic device 200; however, the display device according to the present embodiment is not limited to a display device. Also, the management device 100 and the electronic device 200 may be connected through a so-called extension cord, and a plurality of electronic devices 200 may be connected through an extension cord (what is called an interconnection of many plugs in one outlet). Also, although FIG. 1 illustrates that the management device 100 and the server 300 perform wireless communication, the management device 100 and the server 300 may perform wired communication. Also, although FIG. 1 illustrates an example in which the management system 1000 includes the server 300, the management system 1000 may not include the server 300. In the above case, the management device 100 may also have a function of the server 300. In addition, although FIG. 1 illustrates an example in which the management device 100 uses the external power supply 400 as a power supply, the management device 100 may include, for example, an internal power supply (not illustrated) and use the internal power supply as a power supply.

[Summary of Management Device 100]

The management device 100 includes a connection unit capable of connecting an external power line EPL connected to the electronic device 200 (hereinafter also referred to as connection unit 102), and supplies power to the electronic device 200 through the external power line EPL and an internal power line included in the management device 100 (not illustrated in FIG. 1; hereinafter referred to as internal power line IPL). Hereinafter, a connection of the internal power line IPL and the external power line EPL may be collectively referred to as a power line.

Also, the management device 100 identifies the electronic device 200 connected by the power line, by communicating with the electronic device 200 through the power line by a high frequency signal superimposed on the power line. Herein, the high frequency signal may be, for example, a signal of a frequency higher than a frequency (for example, 50 [Hz] or 60 [Hz]) of power supplied to the electronic device 200 through the power line, such as a signal of 13.56 [MHz]. Also, it is needless to say that the high frequency signal according to the present embodiment is not limited to a signal of 13.56 [MHz].

More specifically, the management device 100 transmits a first high frequency signal, which is a high frequency signal used to transmit identification information to the electronic device 200, through the power line. Also, the management device 100 receives identification information, which is transmitted as a high frequency signal by load modulation by the electronic device 200 driven by obtaining power from the first high frequency signal, through the power line. Herein, the identification information according to the present embodiment is information that can be used to identify an electronic device. The identification information may be, for example, data indicating a unique identification number of an electronic device, data indicating a type of an electronic device (for example, data indicating a maker, a model number, or the like), power waveform data indicating a power waveform in using an electronic device (in operating an electronic device), or the like. Also, the identification information according to the present embodiment is not limited to the above examples, and may be any information that can be used to identify an electronic device.

Also, the management device 100 transmits the first high frequency signal when a connection state change is detected in the connection unit 102. By transmitting the first high frequency signal when detecting a connection state change in the connection unit 102, the management device 100 can reduce the power consumption by transmission of the first high frequency signal. Also, the transmission of the first high frequency signal in the management device 100 according to the present embodiment is not limited to the above. For example, the management device 100 may transmit the first high frequency signal periodically or aperiodically. Even in the above case, for example, by adjusting the period of transmission of the first high frequency signal, the power consumption by transmission of the first high frequency signal can be reduced. Hereinafter, a case in which the management device 100 transmits the first high frequency signal when detecting a connection state change in the connection unit 102 will be mainly described as an example.

Accordingly, by using the identification information received from the electronic device 200 through the power line, the management device 100 can identify the electronic device 200 connected to the external power line EPL connected to the connection unit 102.

Also, the communication through the power line between the management device 100 and the electronic device 200 is not limited to the communication related to acquisition of the identification information. For example, the management device 100 may transmit a second high frequency signal, which is a high frequency signal for causing the electronic device 200 connected to the external power line EPL to perform a predetermined process, through the power line. In the above case, the management device 100 may perform communication related to the predetermined process with the electronic device 200 by receiving a response signal for the second high frequency signal that is transmitted as a high frequency signal by load modulation by the electronic device 200 driven by obtaining power from the second high frequency signal.

Herein, the predetermined process may be, for example, an authentication process of the electronic device 200, a process of transmitting an electronic value (money or data having a value equivalent to money) stored in the electronic device 200, a process of updating the electronic value in the electronic device 200, a process of controlling a power supply such as turning on/off a main power supply of the electronic device 200 or changing it to a power saving mode, or the like. Accordingly, when the management device 100 and the electronic device 200 perform communication through the power line, the management system 1000 implements, for example, a charging process using the electronic value stored in the electronic device 200, or a process related to the power control of the electronic device 200. Also, it is needless to say that the process implemented by the communication through the power line between the management device 100 and the electronic device 200 in the management system 1000 according to the present embodiment is not limited to the above examples.

Also, the management device 100 may communicate with the server 300 capable of performing various processes. Herein, the communication between the management device 100 and the server 300 may be, for example, transmitting various information (data), such as acquired identification information, information about power consumption of the electronic device 200 measured by the management device 100, or the like, from the management device 100 to the server 300. When the management device 100 transmits various information to the server 300 as above, the server 300 may perform, for example, a process of managing the power of the electronic device 200 connected to the management device 100 for the purpose of power saving measures or the like, or a process of predicting power demand by interpretation of a power utilization pattern.

Also, the communication between the management device 100 and the server 300 is not limited to the above. For example, the management device 100 may receive data for use in various processes that are transmitted from the server 300. Accordingly, the management device 100 may perform various processes using data acquired from the server 300. More specifically, for example, even when the identification information acquired from the electronic device 200 is data indicating a maker, a model number, or the like, which could not be identified by the management device 100, the management device 100 may identify the electronic device 200 using the data acquired from the server 300. Also, the management device 100 may perform, for example, power management of the connected electronic device 200 in more detail using the data acquired from the server 300. Also, it is needless to say that the process in the management device 100 using the data acquired from the server 300 is not limited to the above.

Also, the management device 100 may receive, for example, a command for causing the electronic device 200 to perform a predetermined process, which is transmitted from the server 300 as a result of the communication with the server 300. When receiving the command for causing the predetermined process, the management device 100 transmits the second high frequency signal to the electronic device 200 through the power line based on the command. Accordingly, by performing communication with the server 300, the management device 100 may cause the electronic device 200 to perform a predetermined process in cooperation with the server 300. Herein, the process performed by the electronic device 200 in cooperation between the server 300 and the management device 100 in the management system 1000 may be, for example, a charging process according to the amount of power supplied from the management device 100 to the electronic device 200. More specifically, the management device 100 implements the above charging process, for example, by transmitting the second high frequency signal for transmitting an electronic value stored in the electronic device 200 to the electronic device 200, or the second high frequency signal for updating the electronic value according to the amount of power. Also, it is needless to say that the process performed by the electronic device 200 in cooperation between the server 300 and the management device 100 in the management system 1000 is not limited to the above charging process.

[Summary of Electronic Device 200]

By the power supplied through the power line, the electronic device 200 performs a process or operation according to a function of the device itself. In the case of the electronic device 200 illustrated in FIG. 1, the process or operation performed by the electronic device 200 according to the function of the device itself may be, for example, various processes such as image processing related to display, operations related to display such as display/non-display, or the like.

Also, regardless of the supply/non-supply of power through the power line, the electronic device 200 performs communication with the management device 100 through the power line by being driven by the power obtained from the high frequency signal that is received through the power line after being transmitted by the management device 100 in superimposition with the power line.

More specifically, when receiving the first high frequency signal, the electronic device 200 reads stored identification information using the power obtained from the first high frequency signal. Then, the electronic device 200 transmits the identification information by superimposing the same on the power line by load modulation using the above power.

Also, when receiving the second high frequency signal, the electronic device 200 performs a predetermined process required by the second high frequency signal using the power obtained from the second high frequency signal. Then, the electronic device 200 transmits a response signal according to a predetermined process by superimposing the same on the power line as a high frequency signal by load modulation using the above power. Herein, the predetermined process required by the second high frequency signal and performed by the electronic device 200 may be, for example, a process related to the charging process, such as transmission of the stored electronic value, update of the electronic value, or the like.

[Server 300]

The server 300 communicates with the management device 100 and receives data such as identification information transmitted from the management device 100. Also, the server 300 transmits data used for processing by the management device 100, a command for causing the electronic device 200 to perform a predetermined process, or the like to the management device 100. Also, the server 300 performs, for example, power management of the electronic device 200 based on information about the power consumption or identification information received from the management device 100, a process related to a charging process for the electronic device 200 in cooperation with the management device 100, and the like.

[External Power Supply 400]

The external power supply 400 is an external power supply when viewed from the management device 100. The external power supply 400 may be, for example, a commercial power supply, a battery, an electrical generator, or the like.

The management system 1000 may have, for example, the configuration illustrated in FIG. 1. In addition, the configuration of the management system 1000 according to the present embodiment is not limited to the configuration illustrated in FIG. 1. For example, as illustrated in FIG. 2, a management device 100 may be connected to each of a plurality of electronic devices 200A, 200B, 200C, . . . (which hereinafter may be collectively referred to as an electronic device 200) by power lines.

In the management system 1000, the management device 100 acquires identification information from the electronic device 200 by communicating with the electronic device 200 through the power line as in the related art, and identifies the electronic device 200 connected by the power line, based on the acquired identification information. Accordingly, in the management system 1000, since the management device 100 can automatically identify the electronic device 200 even without an input operation of the user, there is no fear of diminishing the convenience of the user. Also, in the management system 1000, since the management device 100 identifies the electronic device 200 using the identification information, the electronic device 200 connected by the power line can be identified more securely, as compared to the case of performing estimation. Herein, the electronic device 200 is driven by the power obtained from the high frequency signal transmitted by the management device 100 in superimposition with the power line, and performs a response by load modulation. Accordingly, in the management system 1000, even when there is an electronic device 200 to which power is not supplied among the electronic devices 200 connected by the power lines, the management device 100 can identify the electronic device 200. Therefore, the management system 1000 can more securely identify the electronic device 200 connected by the power line, as compared to the related art in which an electronic device that is connected to a power line but to which power is not supplied cannot be recognized.

Also, in the management system 100, since the electronic device 200 is driven by the power obtained from the high frequency signal transmitted by the management device 100 in superimposition with the power line and performs a response by load modulation, the electronic device 200 may not include a separate power supply circuit related to communication through the power line. Also, the electronic device 200 may perform communication with the management device 100 through the power line using a communication device having the same configuration as a communication device used in wireless communication technology such as NFC-based communication technology, RFID technology, or the like (a detailed configuration example of which will be described later). Therefore, in the management system 1000, as compared to the case of using the related art in which communication is performed by the existing PLC, the size of devices related to communication can be easily reduced, and the costs thereof can be reduced.

In addition, since the communication through the power line in the management system 1000 is compatible with wireless communication technology such as NFC-based communication technology, RFID technology, or the like, communication collision prevention technology (so-called anticollision) of the wireless communication technology can be used. Therefore, the management system 1000 can prevent the inability to identify the electronic device 200 connected by the power line even when power is supplied to the electronic device 200, which may occur when the related art in which communication is performed by the existing PLC is used.

Therefore, by using the management method according to the present embodiment, a management system capable of identifying an electronic device connected by a power line can be realized.

(Management System According to Present Embodiment)

Next, examples of configurations of the management device 100 and the electronic device 200 included in the management system 1000 capable of implementing the process of the management method according to the present embodiment will be described. Hereinafter, configurations of management devices 100 according to first to fourth embodiments, and a configuration of the electronic device 200 capable of communicating with each of the management devices 100 according to the first to fourth embodiments by the power line, will be described. In addition, the configuration of the management device 100 described below corresponds to an example of the configuration of the reception device according to the present embodiment, and the configuration of the electronic device 200 described below corresponds to an example of the configuration of the transmission device according to the present embodiment.

First Embodiment

Figure 3:
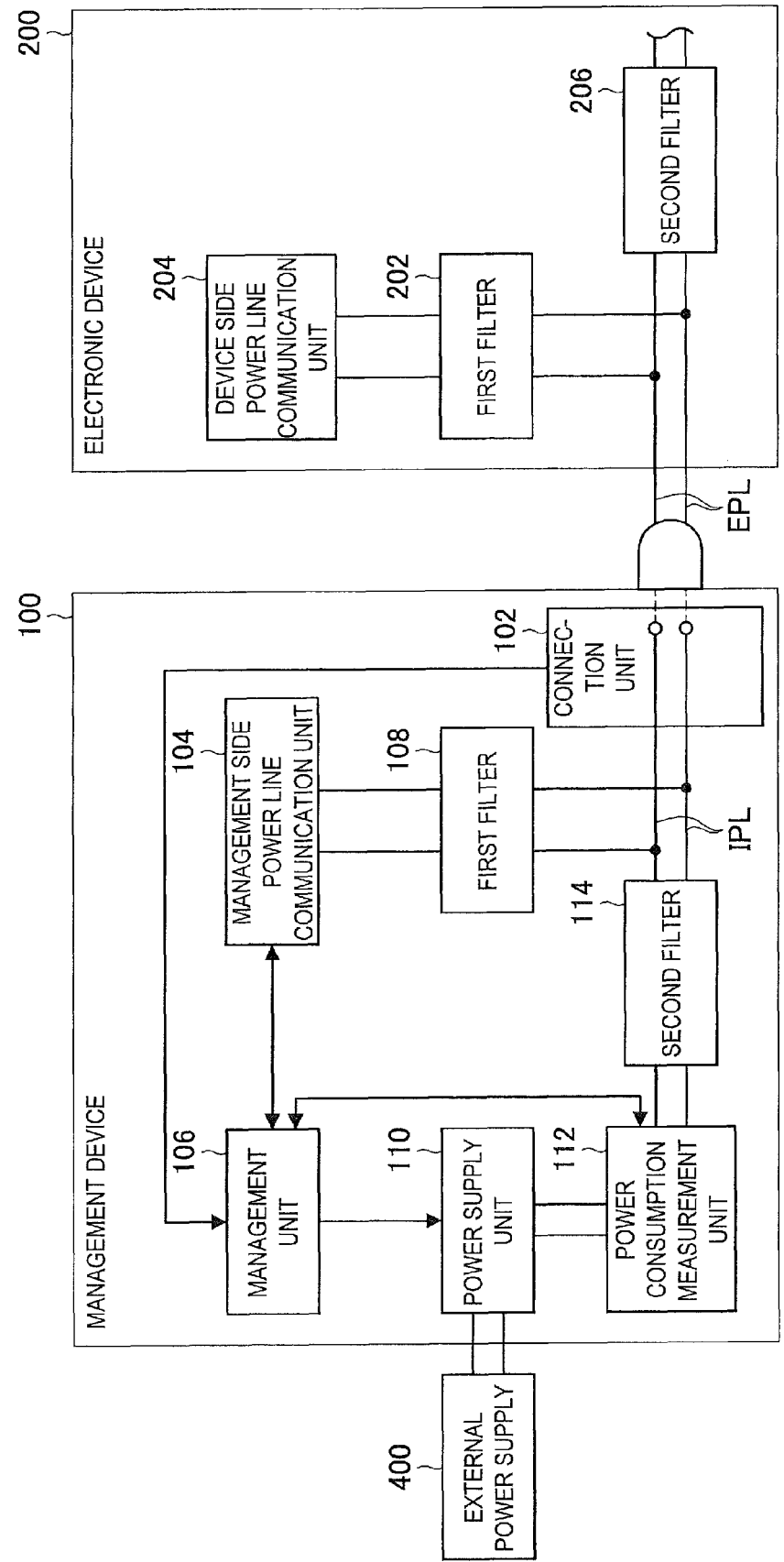
FIG. 3 is an illustration diagram illustrating an example of the configurations of a management device according to a first embodiment and an electronic device according to the present embodiment.

FIG. 3 is an illustration diagram illustrating an example of the configuration of a management device 100 according to the first embodiment and an example of the configuration of an electronic device 200 according to the present embodiment. In FIG. 3, the management device 100 and the electronic device 200 are illustrated together with an external power supply 400.

[Management Device 100]

Referring to FIG. 3, the management device 100 includes a connection unit 102, a management side power line communication unit 104 (high frequency signal output unit, reception unit), a management unit 106, a first filter 108 (communication filter or management side communication filter), a power supply unit 110, a power consumption measurement unit 112, and a second filter 114.

Also, the management device 100 may include, for example, a Read Only Memory (ROM; not illustrated), a Random Access Memory (ROM; not illustrated), a storage unit (not illustrated), a display unit (not illustrated), and the like. The management device 100 may connect the respective elements, for example, by a bus as a data transmission path. Herein, the ROM (not illustrated) stores a program used by the management unit 106, and control data such as operation parameters or the like. The RAM (not illustrated) temporarily stores a program or the like executed by the management unit 106.

The storage unit (not illustrated) stores various data such as identification information acquired from the electronic device 200, applications, or the like. Herein, the storage unit (not illustrated) may be, for example, a magnetic recording medium such as a hard disk or the like, or a nonvolatile memory such as an Electrically Erasable and Programmable Read Only Memory (EEPROM), a flash memory, a Magnetoresistive Random Access Memory (MRAM), a Ferroelectric Random Access Memory (FeRAM), a Phase-change Random Access Memory (PRAM), or the like. Also, the management device 100 may include a storage unit (not illustrated) that is attachable/detachable to/from the management device 100. The display unit (not illustrated) is a display unit included in the management device 100. The display unit displays a variety of information (for example, images and/or characters) on a display screen. A screen displayed on the display screen of the display unit (not illustrated) may be, for example, an operation screen for causing the management device 100 to perform a desired operation, or the like. Herein, the display unit (not illustrated) may be, for example, a Liquid Crystal Display (LCD), an organic ElectroLuminescence display (organic EL display, which is also referred to as an Organic Light Emitting Diode display (OLED display)), or the like. Also, the management device 100 may include, for example, a touchscreen display unit (not illustrated). In the above case, the display unit (not illustrated) functions as an operation display unit capable of user operation and display. Also, regardless of the inclusion/non-inclusion of the display unit (not illustrated), the management device 100 may communicate with an external terminal through a network (or directly), and may display the operation screen or a variety of information on a display screen of the external terminal. For example, when the external terminal is an external terminal (for example, a portable communication device, a remote controller, or the like) owned by a user of the management device 100, the user may operate his or her own external terminal to cause the management device 100 to perform a desired process, and may use the external terminal to check information transmitted from the management device 100. Accordingly, in the above case, the convenience of the user can be improved when it is difficult for the user to directly operate the management device 100 or to view information displayed on the display unit (not illustrated), for example, when the management device 100 is installed under a desk, or the like.

The connection unit 102 includes terminals, and connects an external power line EPL and an internal power line IPL. Also, the connection unit 102 detects a connection state change of the external power line EPL (change from non-connection state to connection state/change from connection state to non-connection state). Then, the connection unit 102 transmits a detection signal indicating the detection (detection result) to the management unit 106. In addition, when the management side power line communication unit 104 to be described later has a function of transmitting the first high frequency signal according to the transmission of the detection signal, the connection unit 102 may transmit the detection signal to the management side power line communication unit 104.

Herein, the connection unit 102 is illustrated, for example, as including a switch for detecting a physical connection state of the external power line and transmitting a detection signal to the management unit 106 when detecting a state of the switch; however, the configuration of the connection unit 102 is not limited thereto. Also, when the management device 100 is configured to transmit the first high frequency signal periodically/aperiodically, the connection unit 102 according to the present embodiment may not have a function related to the detection of a connection state change of the external power line EPL.

The management side power line communication unit 104 performs communication with the electronic device 200 through the power line.

Figure 4:
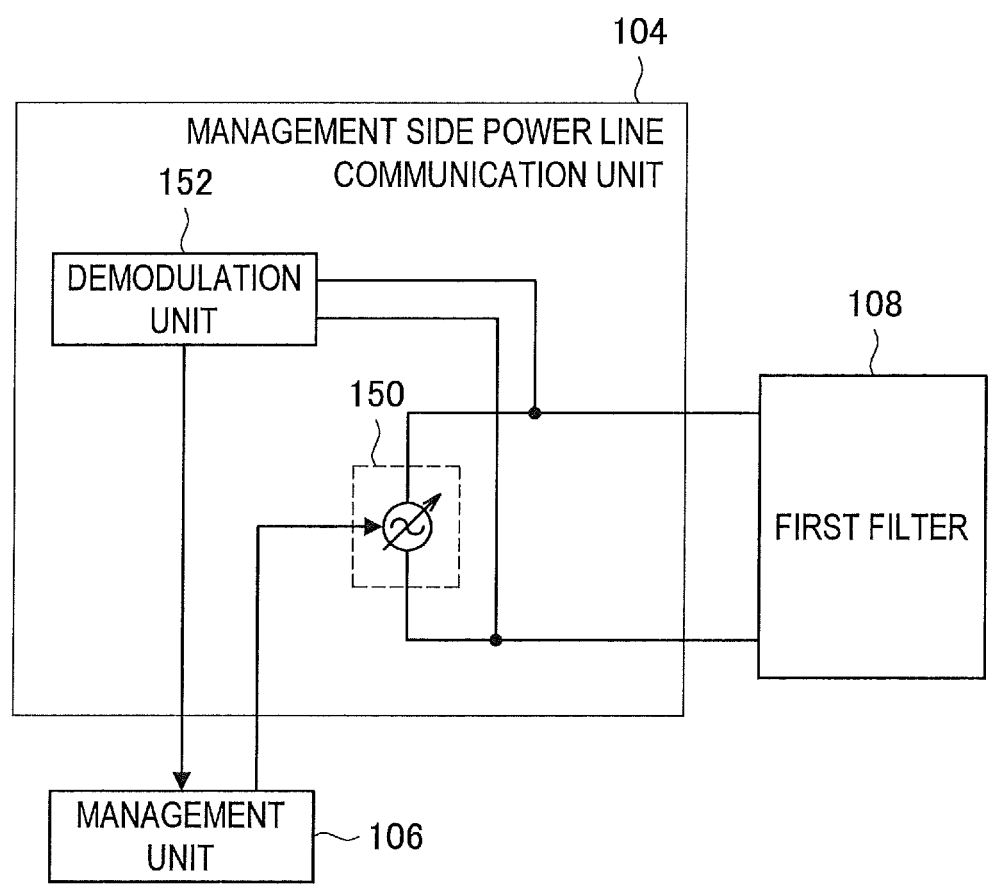
FIG. 4 is an illustration diagram illustrating an example of a management side power line communication unit included in a management device according to the present embodiment.

FIG. 4 is an illustration diagram illustrating an example of the management side power line communication unit 104 included in the management device 100 according to the present embodiment. In FIG. 4, the management side power line communication unit 104 is illustrated together with the management unit 106 and the first filter 108. The management side power line communication unit 104 includes a high frequency signal generation unit 150 and a demodulation unit 152, and functions as a reader/writer (interrogator) in NFC or the like. Also, the management side power line communication unit 104 may further include, for example, an encryption circuit (not illustrated), a communication collision prevention (anti-collision) circuit, or the like.

The high frequency signal generation unit 150, for example, receives a high frequency signal generation command from the management unit 106 and generates a high frequency signal according to the high frequency signal generation command. Also, the high frequency signal generation unit 150, for example, receives a high frequency signal transmission stop command indicating the stop of transmission of a high frequency signal from the management unit 106 and stops generation of the high frequency signal according to the high frequency signal transmission stop command. Herein, in FIG. 4, an alternating current power supply is illustrated as the high frequency signal generation unit 150; however, the high frequency signal generation unit 150 according to the present embodiment is not limited thereto. For example, the high frequency signal generation unit 132 according to the present embodiment may include a modulation circuit (not illustrated) configured to perform Amplitude Shift Keying (ASK) modulation, and an amplification circuit (not illustrated) configured to amplify an output of the modulation circuit. Also, the high frequency signal generated by the high frequency signal generation unit 150 may be, for example, the first high frequency signal including a transmission request for transmission of the identification information by the electronic device 200, or the second high frequency signal including processed data or various process commands for the electronic device 200; however, the high frequency signal according to the present embodiment is not limited thereto. For example, the high frequency signal according to the present embodiment may be a signal (for example, an unmodulated signal) for performing power supply to the device side power line communication unit 204 of the electronic device 200, which will be described later. Also, the signal for performing the power supply may function as the first high frequency signal (that is, when the first high frequency signal is an unmodulated signal).

The demodulation unit 152, for example, envelope-detects an amplitude change of a voltage between the high frequency signal generation unit 150 and the first filter 108 and binarizes a detection signal to demodulate a response signal transmitted from the electronic device 200. Then, the demodulation unit 152 transmits the demodulated response signal (for example, a response signal indicating the identification information, or a response signal indicating a response based on the process according to the second high frequency signal) to the management device 106. In addition, the demodulation of the response signal in the demodulation unit 152 is not limited to the above. For example, the response signal may be demodulated using a phase change of a voltage between the high frequency signal generation unit 150 and the first filter 108.

Figure 5:
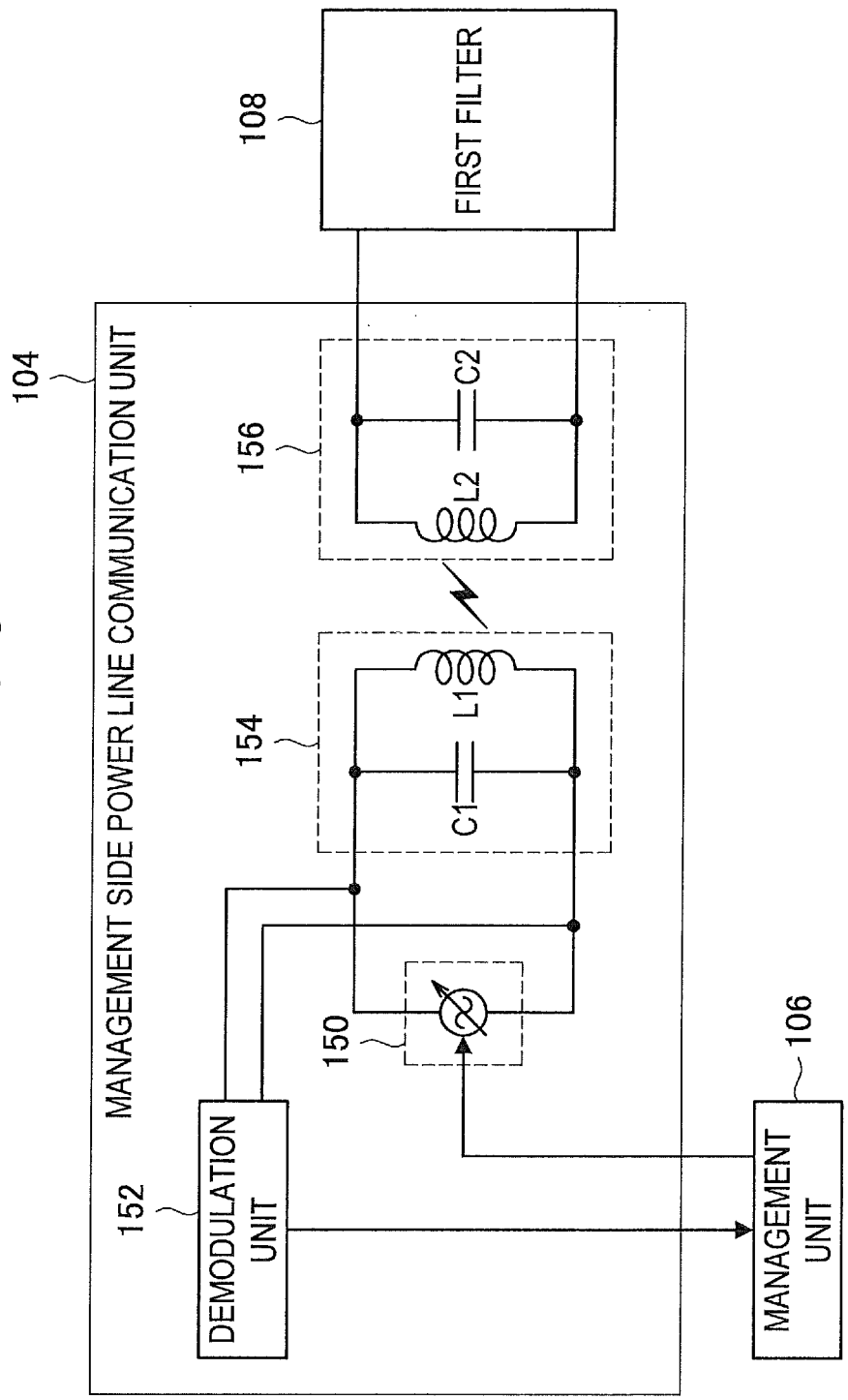
FIG. 5 is an illustration diagram illustrating another example of a management side power line communication unit included in a management device according to the present embodiment.

In addition, the configuration of the management side power line communication unit 104 according to the present embodiment is not limited to the configuration illustrated in FIG. 4. FIG. 5 is an illustration diagram illustrating another example of the management side power line communication unit 104 included in the management device 100 according to the present embodiment. Like in FIG. 4, in FIG. 5, the management side power line communication unit 104 is illustrated together with the management unit 106 and the first filter 108.

The management side power line communication unit 104 according to the other example includes a high frequency signal generation unit 150, a demodulation unit 152, a first high frequency transmission/reception unit 154, and a second high frequency transmission/reception unit 156. Also, the management side power line communication unit 104 according to the other example may further include, for example, an encryption circuit (not illustrated), a communication collision prevention (anti-collision) circuit, or the like.

Like the high frequency signal generation unit 150 illustrated in FIG. 4, the high frequency signal generation unit 150 generates a high frequency signal according to a high frequency signal generation command, and stops generation of a high frequency signal according to a high frequency signal transmission stop command.

The demodulation unit 152 envelope-detects an amplitude change of a voltage in an antenna terminal of the high frequency signal generation unit 150 and binarizes a detection signal to demodulate a response signal transmitted from the electronic device 200. In addition, the demodulation of the response signal in the demodulation unit 152 is not limited to the above. For example, the response signal may be demodulated using a phase change of a voltage in the antenna terminal of the high frequency signal generation unit 150.

The first high frequency transmission/reception unit 154 includes, for example, a coil L1 with a predetermined inductance (inductor, the same below) and a capacitor C1 with a predetermined capacitance to constitute a resonance circuit. Herein, a resonance frequency of the first high frequency transmission/reception unit 156 may be, for example, a frequency of a high frequency signal, such as 13.56 [MHz]. By the above configuration, the first high frequency transmission/reception unit 154 may transmit the high frequency signal generated by the high frequency signal generation unit 150, and receive the response signal transmitted from the electronic device 200 and transmitted from the second high frequency transmission/reception unit 156. That is, the first high frequency transmission/reception unit 154 functions as a first communication antenna in the management side power line communication unit 104.

The second high frequency transmission/reception unit 156 includes, for example, a coil L2 with a predetermined inductance and a capacitor C2 with a predetermined capacitance to constitute a resonance circuit. Herein, a resonance frequency of the second high frequency transmission/reception unit 156 may be, for example, a frequency of a high frequency signal, such as 13.56 [MHz]. By the above configuration, the second high frequency transmission/reception unit 156 may receive the high frequency signal transmitted from the first high frequency transmission/reception unit 154, and transmit the response signal transmitted from the electronic device 200. That is, the second high frequency transmission/reception unit 156 functions as a second communication antenna in the management side power line communication unit 104.

Like in the configuration illustrated in FIG. 4, by the configuration illustrated in FIG. 5, the management side power line communication unit 104 according to the present embodiment functions as a reader/writer in NFC or the like, and performs communication with the electronic device 200 through the power line.

Referring back to FIG. 3, the configuration of the management device 100 according to the first embodiment will be described. The management unit 106 includes an integrated circuit of various processing circuits, a Micro Processing Unit (MPU), or the like, and functions as a control unit controlling the respective units of the management device 100. More specifically, the management unit 106, for example, controls communication in the management side power line communication unit 104 by transmitting a high frequency signal generation command or a high frequency signal transmission stop command to the management side power line communication unit 104 based on a detection signal received from the connection unit 102 or a response signal from the electronic device 200 received from the management side power line communication unit 104. By transmitting the high frequency signal generation command or the high frequency signal transmission stop command to the management side power line communication unit 104 based on the detection signal, the management unit 106 can actually communicate with the electronic device 200 connected by the power line. When the management unit 106 transmits the high frequency signal generation command or the high frequency signal transmission stop command to the management side power line communication unit 104 as above, the management side power line communication unit 104 can transmit the first high frequency signal, for example, based on the detection result in the connection unit 102. Also, by transmitting the high frequency signal generation command or the high frequency signal transmission stop command to the management side power line communication unit 104 based on the response signal, the management unit 106 can control the communication with the electronic device 200 through the power line. Also, the management unit 106 may periodically/aperiodically transmit the high frequency signal generation command to the management side power line communication unit 104 to periodically/aperiodically transmit the first high frequency signal to the management side power line communication unit 104.

Also, the management unit 106 controls an operation of the power supply unit 110, for example, by transmitting a control signal for controlling the selective power supply to the internal power line IPL in the power supply unit 110 to the power supply unit 110. Also, the management unit 106 controls an operation of the power consumption measurement unit 112, for example, by transmitting a control signal for controlling the stop/start of measurement of the power consumption of the electronic device 200 in the power consumption measurement unit 112 to the power consumption measurement unit 112. In addition, the management unit 100 according to the present embodiment may include a separate control unit (not illustrated) that controls the respective units of the management unit 100.

Also, the management unit 106 identifies the electronic device 200 connected to the external power line EPL connected to the connection unit 102, based on the identification information that is received by the management side power line communication unit 104 from the electronic device 200 through the power line. Also, the management unit 106 stores information indicating the identified electronic device 200 in a storage unit (not illustrated) as information indicating the electronic device 200 connected to the external power line EPL connected to the connection unit 102. Hereinafter, the information indicating the electronic device 200 connected to the external power line EPL connected to the identified connection unit 102 (or the electronic device 200 connected to each of the external power lines connected to a plurality of connection units) may be referred to as connection state information. Herein, the connection state information according to the present embodiment may be the identification information itself, or other types of data such as list-type data, a database storing information indicated by the identification information, or the like.

Also, when receiving information about the power consumption measured by the power consumption measurement unit 112 from the power consumption measurement unit 112, the management unit 106 stores the power consumption information and the connection state information corresponding to the electronic device 200 as a measurement target of the power consumption measurement unit 112 in an associated manner. Herein, the management unit 106 associates the power consumption information with the connection state information, for example, by converting the connection state information into a relational database (when the connection state information is a database type). In addition, a method of associating the power consumption information with the connection state information according to the present embodiment is not limited thereto, and the management unit 106 may use any method capable of associating the power consumption information with the connection state information according to the present embodiment.

The first filter 108 is connected between the management side power line communication unit 104 and the internal power line IPL, and functions to filter a signal received from the internal power line IPL. More specifically, the first filter 108 has a function of blocking at least a signal of a frequency of power supplied to the electronic device 200 through the power line, among the signals received from the internal power line IPL, and passing a high frequency signal. By including the first filter 108, the management device 100 does not transmit a signal of a frequency of power that may be a noise to the management side power line communication unit 104. Therefore, the accuracy of communication between the management side power line communication unit 104 and the electronic device 200 (specifically, the device side power line communication unit 204 of the electronic device 200, which will be described later) can be improved.

Figure 6:
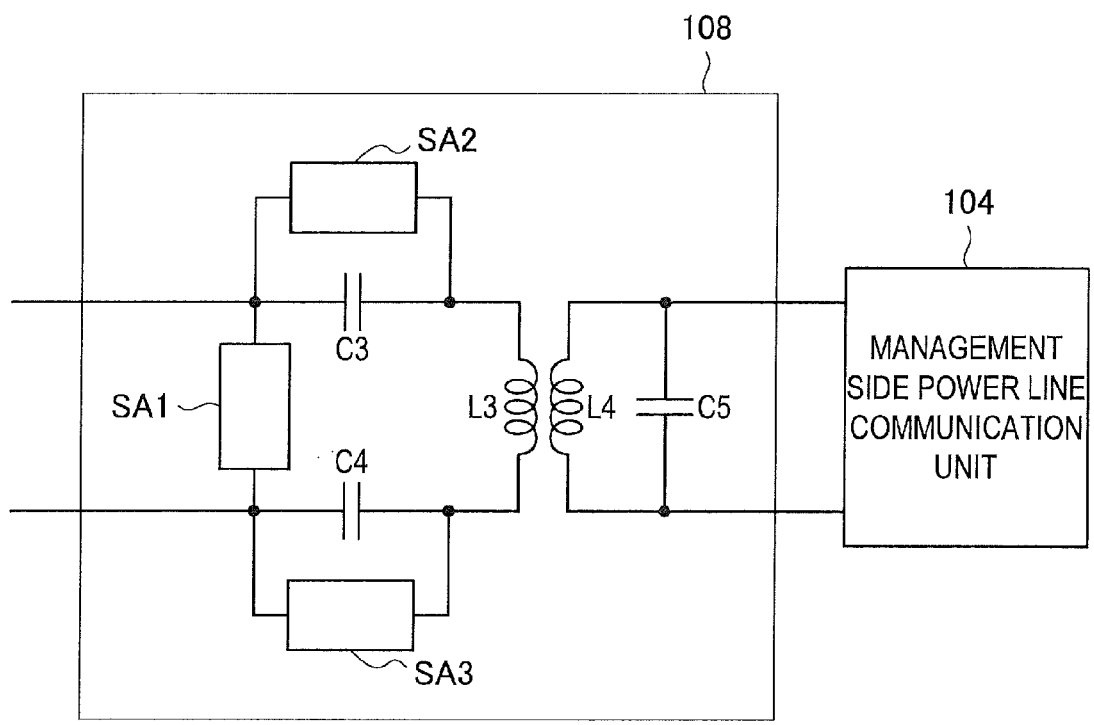
FIG. 6 is an illustration diagram illustrating an example of the configuration of a first filter included in a management device according to the present embodiment.

FIG. 6 is an illustration diagram illustrating an example of the configuration of the first filter 108 included in the management device 100 according to the present embodiment. The first filter 108 includes inductors L3 and L4, capacitors C3 to C5, and surge absorbers SA1 to SA3. In addition, it is needless to say that the configuration of the first filter 108 according to the present embodiment is not limited to the configuration illustrated in FIG. 6.

Referring back to FIG. 3, the configuration of the management device 100 according to the first embodiment will be described. Based on a control signal received from the management unit 106 (or a separate control unit (not illustrated) when provided), the power supply unit 110 selectively connects an internal power supply (not illustrated) or the external power supply 400 and the internal power line IPL, and selectively supplies power to the internal power line IPL. Herein, the power supply unit 110 may be, for example, a switch that is turned on/off based on a control signal. Herein, the switch includes, for example, a p-channel MOSFET or an n-channel MOSFET; however, the configuration of the switch is not limited thereto. In addition, the management device 100 according to the present embodiment, including the second to fourth embodiments to be described later, may not include the power supply unit 110.

The power consumption measurement unit 112 measures the power consumption of the electronic device 200 connected to the external power line EPL connected to the connection unit 102. Then, the power consumption measurement unit 112 transmits the power consumption measurement information to the management unit 106. Also, the power consumption measurement unit 112 may selectively perform the measurement based on a control signal received from the management unit 106 (or a separate control unit (not illustrated) when provided). Herein, the power consumption measurement unit 112 may be, for example, a power consumption meter. In addition, the management device 100 according to the present embodiment, including the second to fourth embodiments to be described later, may not include the power consumption measurement unit 112.

The second filter 114 is provided on the internal power line IPL between the connection unit 102 and the power consumption measurement unit 112, and functions to filter a signal that may be received from the connection unit 102. More specifically, the second filter 114 has a function of blocking at least a high frequency signal transmitted by the electron line communication unit 104 or a high frequency signal transmitted by the electronic device 200, and passing a signal of a frequency of power supplied to the electronic device 200. By including the second filter 114, the management device 100 can block a high frequency signal by communication through the power line, or a noise component that may be received from the electronic device 200. That is, the second filter 114 functions as a so-called power splitter.

Figure 7:
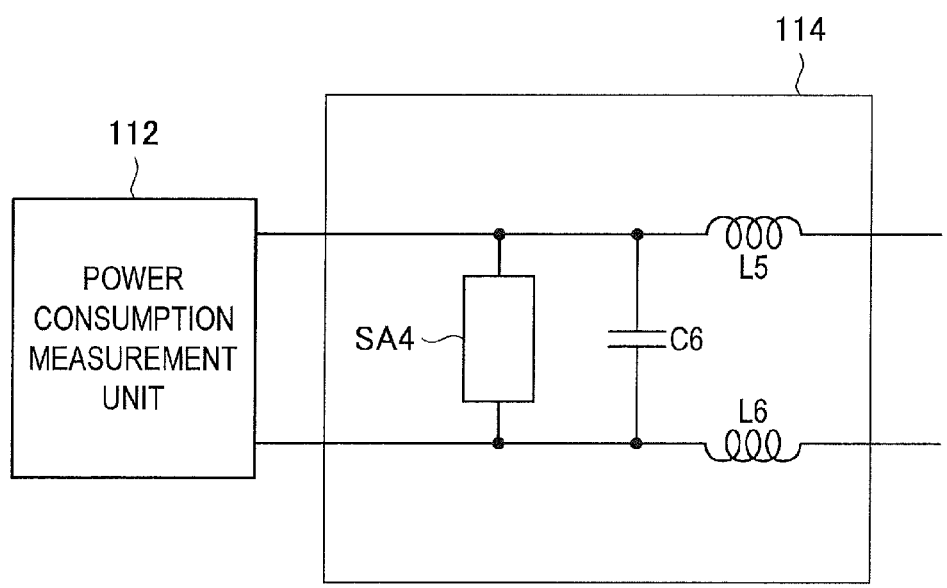
FIG. 7 is an illustration diagram illustrating an example of the configuration of a second filter included in a management device according to the present embodiment.

FIG. 7 is an illustration diagram illustrating an example of the configuration of the second filter 114 included in the management device 100 according to the present embodiment. The second filter 114 includes inductors L5 and L6, a capacitor C6, and a surge absorber SA4. In addition, it is needless to say that the configuration of the second filter 114 according to the present embodiment is not limited to the configuration illustrated in FIG. 7.

For example, by the configuration illustrated in FIG. 3, the management device 100 according to the first embodiment can communicate with the electronic device 200 connected to the external power line EPL connected to the connection unit 102 through the power line, and identify the electronic device 200. Also, by the configuration illustrated in FIG. 3, the management device 100 according to the first embodiment can transmit a second high frequency signal to the identified electronic device 200 to cause the electronic device 200 to perform a predetermined process based on the second high frequency signal.

[Electronic Device 200]

Next, an example of the configuration of the electronic device 200 according to the present embodiment will be described. The electronic device 200 is in one-to-one correspondence with the external power line EPL, and the external power line EPL is connected to the connection unit 102 of the management device 100. In addition, although not illustrated in FIG. 3, the external power line EPL may be connected through an extension cord to the connection unit 102 of the management device 100. Also, in the example illustrated in FIG. 3, a portion of the external power line EPL connected to the connection unit 102 of the management device 100 corresponds to the terminal of the electronic device 200.

Also, the electronic device 200 includes a first filter 202 (communication filter or device side communication filter), a device side power line communication unit 204 (transmission unit), and a second filter 206.

Also, at the rear side of the second filter 206 (opposite side of the second filter 206 with respect to the management device 100 illustrated in FIG. 3), the electronic device 200 includes, for example, a battery (not illustrated), various devices for implementing functions of the electronic device 200 (for example, a drive unit and a display unit (not illustrated)), and the like. That is, for example, the electronic device 200 may charge the battery (not illustrated) with the power supplied from the management device 100 through the power line, and may implement the functions of the electronic device 200 using the supplied power. For example, when the electronic device 200 is a vehicle such as an Electric Vehicle (EV) or the like, the electronic device 200 charges a built-in battery by receiving power supply, and rotates a wheel using power of the built-in battery. Also, when the electronic device 200 includes a display unit capable of displaying images (still images/moving images) and/or characters, the electronic device 200 receives power supply to display images or characters on a display screen of the display unit.

The first filter 202 is connected between the power line (specifically, the external power line EPL in the electronic device 200; the same below) and the device side power line communication unit 204, and functions to filter a signal received from the power line. More specifically, the first filter 202 has a function of blocking at least a signal of a frequency of power among the signals received from the power line, and passing a high frequency signal. By including the first filter 202, the electronic device 200 does not transmit a signal of a frequency of power that may be a noise to the device side power line communication unit 204. Therefore, the accuracy of communication between the management side power line communication unit 104 of the management device 100 and the device side power line communication unit 204 can be improved.

Herein, the first filter 202 may have, for example, the same configuration as the first filter 108 of the management device 100 illustrated in FIG. 6. In addition, it is needless to say that the configuration of the first filter 202 according to the present embodiment is not limited to the configuration illustrated in FIG. 6.

The device side power line communication unit 204 communicates with the management device 100 (external device) through the power line by a high frequency signal. More specifically, when receiving a high frequency signal transmitted from the management device 100, the device side power line communication unit 204 is driven by power obtained from the high frequency signal, to perform a process indicated by the received high frequency signal. Then, the device side power line communication unit 204 transmits a response signal according to the process by load modulation as a high frequency signal. For example, when receiving a first high frequency signal, the device side power line communication unit 204 transmits stored identification information in superimposition with the power line by load modulation according to the first high frequency signal. Also, for example, when receiving a second high frequency signal, the device side power line communication unit 204 performs a process based on the second high frequency signal, and transmits a response signal based on the process in superimposition with the power line. That is, the device side power line communication unit 204 functions as a transponder in NFC.

Figure 8:
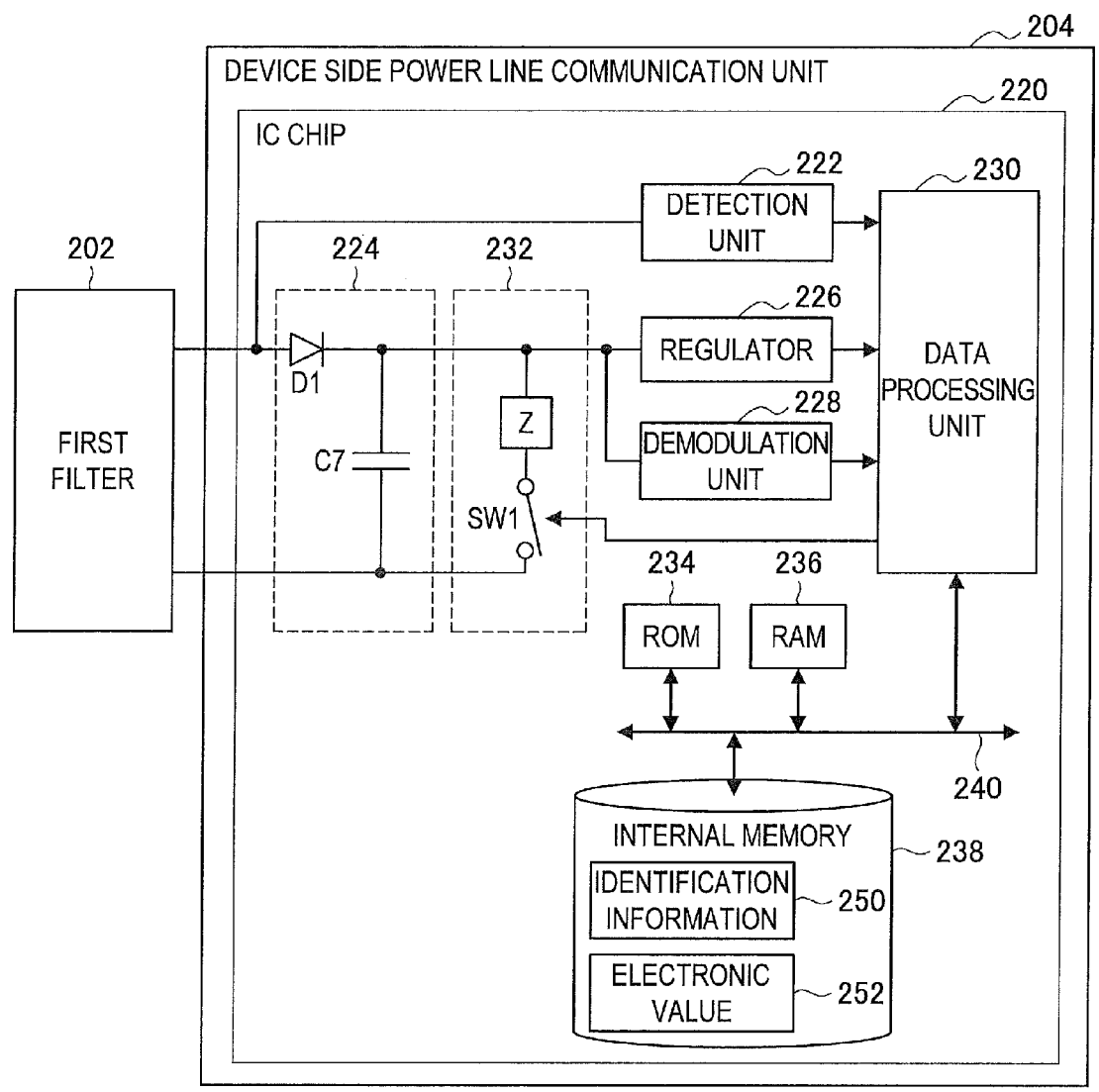
FIG. 8 is an illustration diagram illustrating an example of a device side power line communication unit included in an electronic device according to the present embodiment.

FIG. 8 is an illustration diagram illustrating an example of the device side power line communication unit 204 included in the electronic device 200 according to the present embodiment. In FIG. 8, the device side power line communication unit 204 is illustrated together with the first filter 202. The electronic device 200 includes an IC chip 220 configured to demodulate and process a received high frequency signal and transmit a response signal by load modulation. Also, the electronic device 200 according to the present embodiment may not include the respective units of the IC chip 220 illustrated in FIG. 8, in the form of an IC chip.

The IC chip 220 includes a detection unit 222, a wave detection unit 224, a regulator 226, a demodulator 228, a data processing unit 230, and a load modulation unit 232. In addition, although not illustrated in FIG. 8, the IC chip 220 may further include a protection circuit (not illustrated) for preventing an overvoltage or an overcurrent from being applied to the data processing unit 230. Herein, the protection circuit (not illustrated) may be, for example, a clamp circuit including a diode and the like.

Also, the IC chip 220 includes a ROM 234, a RAM 236, and an internal memory 238. The data processing unit 230, the ROM 234, the RAM 236, and the internal memory 238 may be connected, for example, by a bus 240 as a data transmission path.

The ROM 234 stores a program used by the data processing unit 230, and control data such as operation parameters or the like. The RAM 236 temporarily stores an execution state, an operation result, a program executed by the data processing unit 230, and the like.

The internal memory 238 is a storage unit included in the IC chip 220. For example, the internal memory 238 includes tamper resistance, and the data processing unit 230 performs data read, new data write, and data update on the internal memory 238. The internal memory 238 stores, for example, various data such as identification information, electronic values, applications, and the like. Herein, FIG. 8 illustrates an example in which the internal memory 238 stores identification information 250 and an electronic value 252.

The detection unit 222 generates, for example, a rectangular detection signal based on a high frequency signal, and transmits the detection signal to the data processing unit 230. Also, the data processing unit 230 uses the received detection signal, for example, as a process clock for data processing. Herein, since the detection signal is based on a high frequency signal transmitted from the management device 100, the detection signal synchronizes with the frequency of the high frequency signal. Therefore, by including the detection unit 222, the IC chip 220 may perform processing with the management device 100 in synchronization with the management device 100.

The wave detection unit 224 rectifies a voltage according to a received high frequency signal (which may hereinafter be referred to as received voltage). Herein, the wave detection unit 224 may include, for example, a diode D1 and a capacitor C7; however, the configuration of the wave detection unit 224 is not limited thereto.

The regulator 226 smooths the received voltage to a constant voltage, and outputs a drive voltage to the data processing unit 230. Herein, the regulator 226 may use a direct current component of the received voltage as a drive voltage.

The demodulation unit 228 demodulates a high frequency signal based on the received voltage, and outputs data corresponding to the high frequency signal (for example, binary data signals of high level and low level). Herein, the demodulation unit 228 may output an alternating current component of the received voltage as data.

The data processing unit 230 is driven by the drive voltage output from the regulator 226, and processes the data demodulated by the demodulation unit 228. Herein, the data processing unit 230 may include, for example, an MPU; however, the configuration of the data processing unit 230 is not limited thereto.

Also, according to the processing result, the data processing unit 230 selectively generates a control signal for controlling load modulation related to a response to the management device 100. Then, the data processing unit 230 selectively outputs the control signal to the load modulation unit 232.

The load modulation unit 232 includes, for example, a load Z and a switch SW1, and performs load modulation by selectively connecting (activating) the load Z according to the control signal received from the data processing unit 230. Herein, the load Z includes, for example, a resistor with a predetermined resistance; however, the configuration of the load Z is not limited thereto. Also, the switch SW1 includes, for example, a p-channel MOSFET or an n-channel MOSFET; however, the configuration of the switch SW1 is not limited thereto.

By the above configuration, the IC chip 220 can process the received high frequency signal, and transmit the response signal in superimposition with the power line by load modulation. In addition, it is needless to say that the configuration of the IC chip 220 according to the present embodiment is not limited to the configuration illustrated in FIG. 8.

By the configuration illustrated in FIG. 8, the power communication unit 204 can be driven by the power obtained from a received high frequency signal, to perform a process indicated by the received high frequency signal and transmit a response signal according to the process by load modulation.

Figure 9:
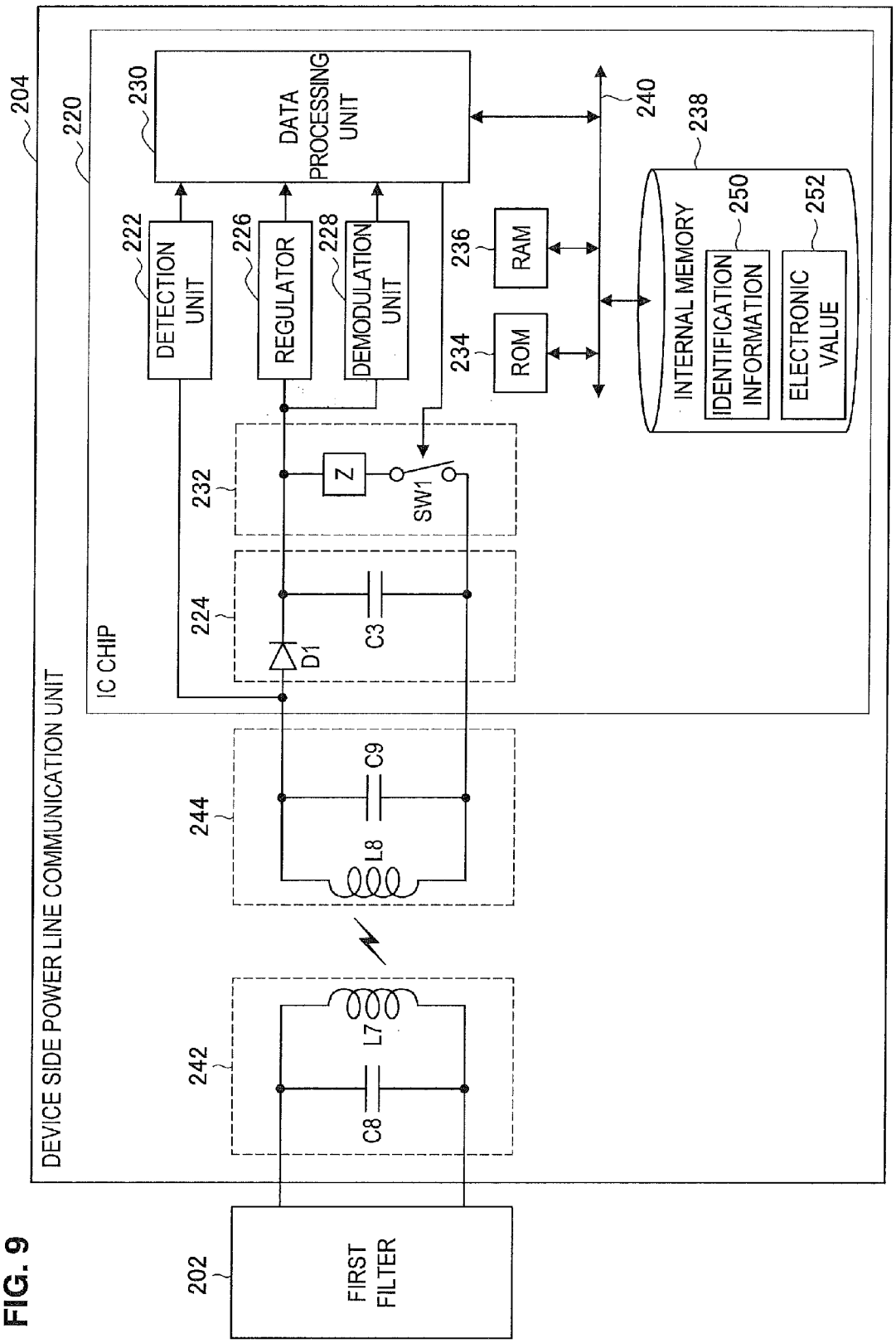
FIG. 9 is an illustration diagram illustrating another example of a device side power line communication unit included in an electronic device according to the present embodiment.

In addition, the configuration of the device side power line communication unit 204 according to the present embodiment is not limited to the configuration illustrated in FIG. 8. FIG. 9 is an illustration diagram illustrating another example of the device side power line communication unit 204 included in the electronic device 200 according to the present embodiment. In FIG. 9, the device side power line communication unit 204 is illustrated together with the first filter 202. Also, the electronic device 200 according to the present embodiment may not necessarily include the respective units of the IC chip 220 illustrated in FIG. 9, in the form of an IC chip.

The power communication unit 204 according to the other example includes a first high frequency transmission/reception unit 242, a second high frequency transmission/reception unit 244, and an IC chip 220.

The first high frequency transmission/reception unit 242 includes, for example, a coil L7 with a predetermined inductance and a capacitor C8 with a predetermined capacitance to constitute a resonance circuit. Herein, a resonance frequency of the first high frequency transmission/reception unit 242 may be, for example, a frequency of a high frequency signal, such as 13.56 [MHz]. By the above configuration, the first high frequency transmission/reception unit 242 may transmit the high frequency signal received from the first filter 202, and receive the response signal transmitted from the second high frequency transmission/reception unit 244. That is, the first high frequency transmission/reception unit 242 functions as a first communication antenna in the device side power line communication unit 204.

The second high frequency transmission/reception unit 244 includes, for example, a coil L8 with a predetermined inductance and a capacitor C9 with a predetermined capacitance to constitute a resonance circuit. Herein, a resonance frequency of the second high frequency transmission/reception unit 244 may be, for example, a frequency of a high frequency signal, such as 13.56 [MHz]. By the above configuration, the second high frequency transmission/reception unit 244 may receive the high frequency signal transmitted from the first high frequency transmission/reception unit 242, and transmit the response signal. More specifically, the second high frequency transmission/reception unit 244 generates an inductive voltage by electromagnetic induction according to reception of a high frequency signal, and outputs a received voltage generated by resonating the inductive voltage at a predetermined resonance frequency, to the IC chip 220. Also, the second high frequency transmission/reception unit 244 transmits a response signal by load modulation performed in the load modulation unit 232 included in the IC chip 220. That is, the second high frequency transmission/reception unit 244 functions as a second communication antenna in the device side power line communication unit 204.

Based on the received voltage received from the second high frequency transmission/reception unit 244, the IC chip 220 performs the same processing as the IC chip 220 illustrated in FIG. 8.

Like the configuration illustrated in FIG. 8, by the configuration illustrated in FIG. 9, the power communication unit 204 can be driven by the power obtained from a received high frequency signal to perform a process indicated by the received high frequency signal and transmit a response signal according to the process by load modulation. Also, when the device side power line communication unit 204 has the configuration illustrated in FIG. 9, since an IC chip related to NFC or RFID can be diverted, mounting becomes easier.

Referring back to FIG. 3, the configuration of the electronic device 200 according to the present embodiment will be described. The second filter 206 functions to filter a signal that may be received from the management device 100 through the external power line EPL. More specifically, the second filter 206 has a function of blocking at least a high frequency signal transmitted by the management device 100 or a high frequency signal transmitted by the electron line communication unit, and passing a signal of a frequency of power supplied through the power line. By including the second filter 206, the electronic device 200 can block a noise component or a high frequency signal by communication through the power line. That is, like the second filter 114 included in the management device 100, the second filter 206 functions as a so-called power splitter.

Herein, the second filter 206 may have, for example, the same configuration as the second filter 114 of the management device 100 illustrated in FIG. 7. In addition, it is needless to say that the configuration of the second filter 206 according to the present embodiment is not limited to the configuration illustrated in FIG. 7.

By the configuration illustrated in FIG. 3, the management device 100 according to the first embodiment and the electronic device 200 according to the present embodiment can perform communication through the power line, and implement the process according to the above-described management method according the present embodiment.

Second Embodiment

Figure 10:
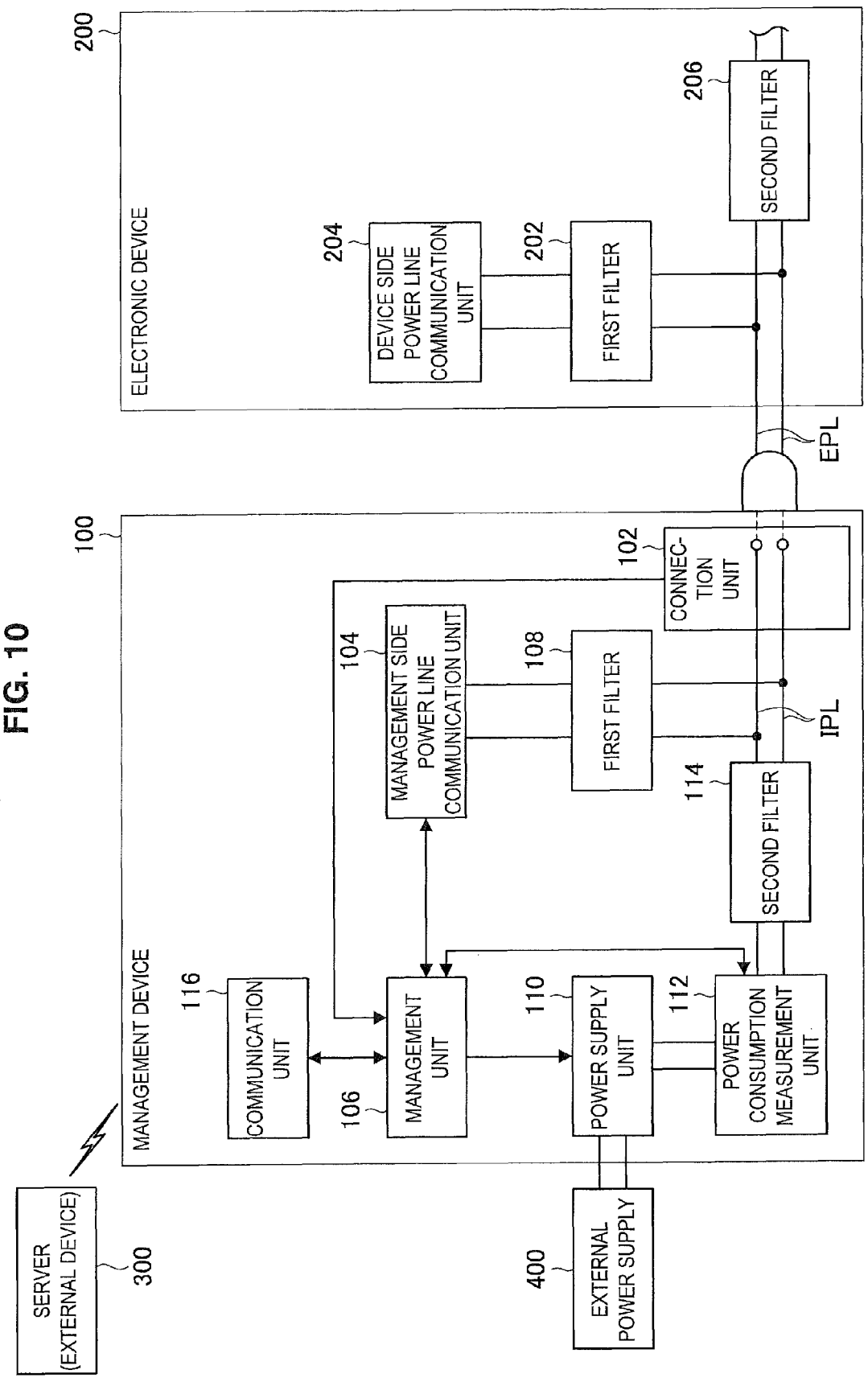
FIG. 10 is an illustration diagram illustrating an example of the configuration of a management device according to a second embodiment.

FIG. 10 is an illustration diagram illustrating an example of the configuration of a management device 100 according to a second embodiment. In FIG. 10, the management device 100 is illustrated together with a server 300, an external power supply 400, and an electronic device 200 according to the present embodiment, which has the same configuration as illustrated in FIG. 3.

The management device 100 according to the second embodiment illustrated in FIG. 10 has substantially the same configuration as the management device 100 according to the first embodiment illustrated in FIG. 3. However, as compared to the management device 100 according to the first embodiment illustrated in FIG. 3, the management device 100 according to the second embodiment further includes a communication unit 116.

The communication unit 116 is a communication unit included in the management device 100, and communicates with the server 300 by wire or wirelessly. Also, communication of the communication unit 116 is controlled by the management unit 106 (or a separate control unit (not illustrated) when provided). Herein, the communication unit 116 may be, for example, a Local Area Network (LAN) terminal and a transmission/reception circuit, an IEEE 802.11g port and a transmission/reception circuit, an IEEE 802.15.4 port and a transmission/reception circuit, or a communication antenna and a Radio Frequency (RF) circuit, or the like; however, the communication unit 116 is not limited thereto. For example, the communication unit 116 may have a configuration capable of communicating with an external device such as the server 300 through a network (or directly).

The management device 100 according to the second embodiment has substantially the same configuration as the management device 100 according to the first embodiment illustrated in FIG. 3. Accordingly, like the management device 100 according to the first embodiment, by the configuration illustrated in FIG. 10, the management device 100 according to the second embodiment can implement the process according to the above-described management method according to the present embodiment.

Also, by including the communication unit 116, the management device 100 according to the second embodiment can perform, for example, transmission of various information (data) such as identification information and power consumption information to the server 300, or reception of data transmitted from the server 300. Also, by including the communication unit 116, the management device 100 according to the second embodiment enables, for example, the electronic device 200 to perform a predetermined process in cooperation with the server 300, such as a charging process according to the amount of power supplied to the electronic device 200.

Third Embodiment

In the above, the configuration of the management device 100, for example, when one electronic device 200 is connected by the power line to the management device 100 as illustrated in FIG. 1, has been illustrated as the management device 100 according to the first embodiment and the management device 100 according to the second embodiment. However, the management device 100 according to the present embodiment is not limited to the above configuration. For example, the management device 100 according to the present embodiment may have a configuration in which a plurality of electronic devices 200 are connected to the management device 100 by power lines as illustrated in FIG. 2. Therefore, next, an example of the configuration by which a plurality of electronic devices 200 can be connected will be described as the management device 100 according to the third embodiment.

Figure 11:
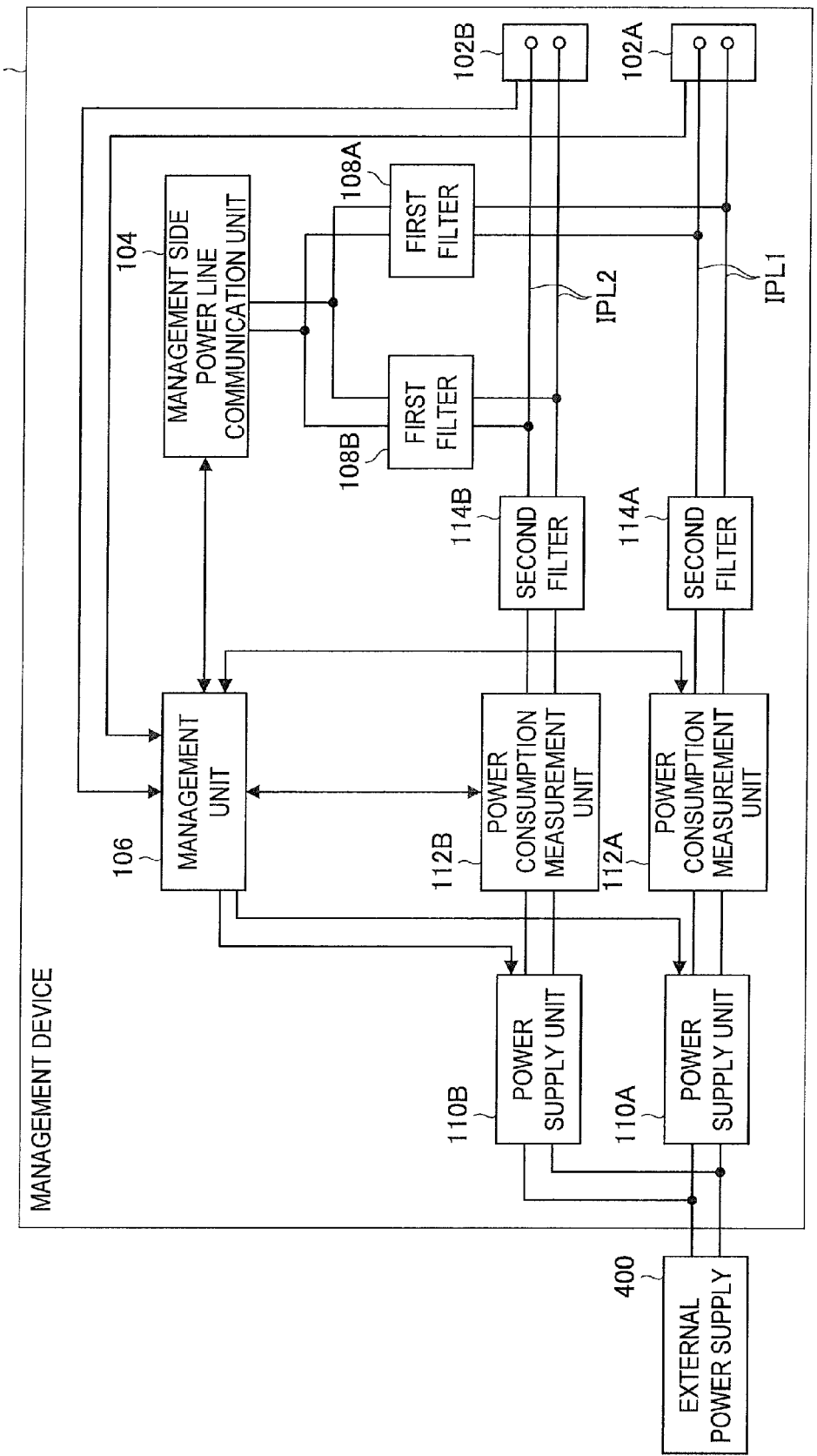
FIG. 11 is an illustration diagram illustrating an example of the configuration of a management device according to a third embodiment.

FIG. 11 is an illustration diagram illustrating an example of the configuration of a management device 100 according to the third embodiment. The management device 100 according to the third embodiment includes connection units 102A and 102B, a management side power line communication unit 104, a management unit 106, first filters 108A and 108B, power supply units 110A and 110B, power consumption measurement units 112A and 112B, and second filters 114A and 114B.

Like the connection unit 102 illustrated in FIG. 3, each of the connection units 102A and 102B connects the external power line EPL and the internal power line IPL (IPL1 and IPL2 in FIG. 11), and detects a connection state change of the external power line EPL. Then, the connection unit 102A/102B transmits a detection signal indicating the detection (detection result) to the management unit 106. Also, each of the connection units 102A and 102B transmits its unique connection unit identification information to the management unit 106 together with the detection signal. Herein, the connection unit identification information according to the present disclosure is information indicating the connection unit that has detected a connection state change of the external power line EPL. By the connection unit identification information received from each of the connection units 102A and 102B together with the detection signal, the management unit 106 can identify in which connection unit a connection state change is detected.

Like the management side power line communication unit 104 illustrated in FIG. 3, the management side power line communication unit 104 performs communication with the electronic device 200 through the power line.

Like the management unit 106 illustrated in FIG. 3, the management unit 106 functions as a control unit for controlling the respective units of the management device 100.

Also, the management unit 106 identifies the electronic device 200 connected to the external power line EPL connected to each of the connection units 102A and 102B, based on the connection state information before transmission of a first high frequency signal, the connection unit identification information received from each of the connection units 102A and 102B together with the detection signal, and the identification information received by the management side power line communication unit 104.

More specifically, for example, the management unit 106 identifies the electronic device 200 whose connection state is changed by comparing a list of electronic devices 200 indicated by the connection state information before transmission of the first high frequency signal with a list of electronic devices 200 based on the identification information received by the management side power line communication unit 104. Also, based on the identified electronic device 200 and the connection unit which is identified by the connection unit identification information and whose connection state change is detected, the management unit 106 identifies which electronic device 200 is connected to which connection unit through the external power line EPL.

Then, the management unit 106 stores information about the identified electronic device as connection state information after transmission of the first high frequency signal. Herein, the management unit 106 stores the connection state information after transmission of the first high frequency signal, for example, by updating the information by overwriting the information about the identified electronic device on the connection state information before transmission of the first high frequency signal. In addition, the management unit 106 may store the connection state information after transmission of the first high frequency signal, separately from the connection state information before transmission of the first high frequency signal.

Also, for example, by transmitting the second high frequency signal including the identification information to the management side power line communication unit 104, the management unit 106 allows the identified electronic device 200 among the connected electronic devices 200 to perform a predetermined process.

Like the first filter 108 illustrated in FIG. 3, each of the first filters 108A and 108B functions to filter a signal received from the internal power line IPL.

Like the power supply unit 110 illustrated in FIG. 3, based on a control signal received from the management unit 106, each of the power supply units 110A and 110B selectively connects an internal power supply (not illustrated) or the external power supply 400 and the internal power line IPL (IPL1 and IPL2 in FIG. 11), and selectively supplies power to the internal power line IPL.

Like the power consumption measurement unit 112 illustrated in FIG. 3, each of the power consumption measurement units 112A and 112B measures the power consumption of the electronic device 200 connected to the external power line EPL connected to each of the connection units 102A and 102B. Then, the power consumption measurement units 112A and 112B transmit the power consumption measurement information to the management unit 106.

Like the second filter 114 illustrated in FIG. 3, each of the second filters 114A and 114B functions to filter a signal that may be transmitted to the connection units 102A and 102B.

The management device 100 according to the third embodiment illustrated in FIG. 11 is different from the management device 100 according to the first embodiment in that it includes a plurality of connection units, and in terms of the process related to the identification of the electronic device 200 in the management unit 106. However, the management device 100 according to the third embodiment illustrated in FIG. 11 has substantially the same configuration as the management device 100 according to the first embodiment illustrated in FIG. 3. Therefore, by the configuration illustrated in FIG. 11, the management device 100 according to the third embodiment can implement the process according to the above-described management method according to the present embodiment.

<Modified Example of Management Device 100 According to Third Embodiment>

In addition, FIG. 11 illustrates that the management device 100 includes two connection units 102A and 102B. However, the configuration of the management device 100 according to the third embodiment is not limited to the configuration illustrated in FIG. 11. For example, the management device 100 according to the third embodiment may be configured to include three or more connection units. Like the management device 100 illustrated in FIG. 11, even by the above configuration, the management device 100 according to a modified example of the third embodiment can identify which electronic device 200 is connected to which connection unit through the external power line EPL.

Also, like the management device 100 according to the second embodiment illustrated in FIG. 10, the management device 100 according to the third embodiment may further include a communication unit 116.

In addition, the management device 100 according to the third embodiment may be configured such that a plurality of management side power line communication units 104 are provided respectively at a plurality of connection units to transmit high frequency signals through respective external power lines EPL connected to the respective connection units.

Fourth Embodiment

FIG. 11 illustrates the configuration in which the high frequency signals transmitted by the management side power line communication unit 104 can be transmitted synchronously through the respective external power lines EPL connected to the plurality of connection units 102A and 102B. By the above configuration, the management device 100 according to the third embodiment performs communication with the respective electronic devices 200 through the power lines in parallel by one management side power line communication unit 104 fewer in number than the connection units 102A and 102B. Therefore, the management device 100 according to the third embodiment illustrated in FIG. 11 can reduce the cost as compared to the configuration including a plurality of management side power line communication units 104. Also, the management device 100 according to the third embodiment illustrated in FIG. 11 can reduce the time taken to communicate with a plurality of connected electronic devices 200, as compared to the case of performing communication with a plurality of connected electronic devices 200 sequentially.

Herein, as above, based on the identified electronic device 200 and the connection unit which is identified by the connection unit identification information and whose connection state change is detected, the management unit 106 according to the third embodiment identifies which electronic device 200 is connected to which connection unit through the external power line EPL. However, in the case of the configuration illustrated in FIG. 11, for example, when the external power lines ELP are almost simultaneously connected to the connection units 102A and 102B, there is a possibility that the management unit 106 cannot identify which electronic device 200 is connected to which connection unit through the external power line EPL.

Thus, the management device 100 according to the fourth embodiment is configured to overcome the above problematic situation, by selectively switching between performing communication with a plurality of connected electronic devices 200 in parallel and performing communication with a plurality of connected electronic devices 200 sequentially. Hereinafter, a description will be given of the management device 100 according to the fourth embodiment that can identify "which electronic device 200 is connected to which connection unit through the external power line EPL," even when the above problematic situation occurs.

Figure 12:
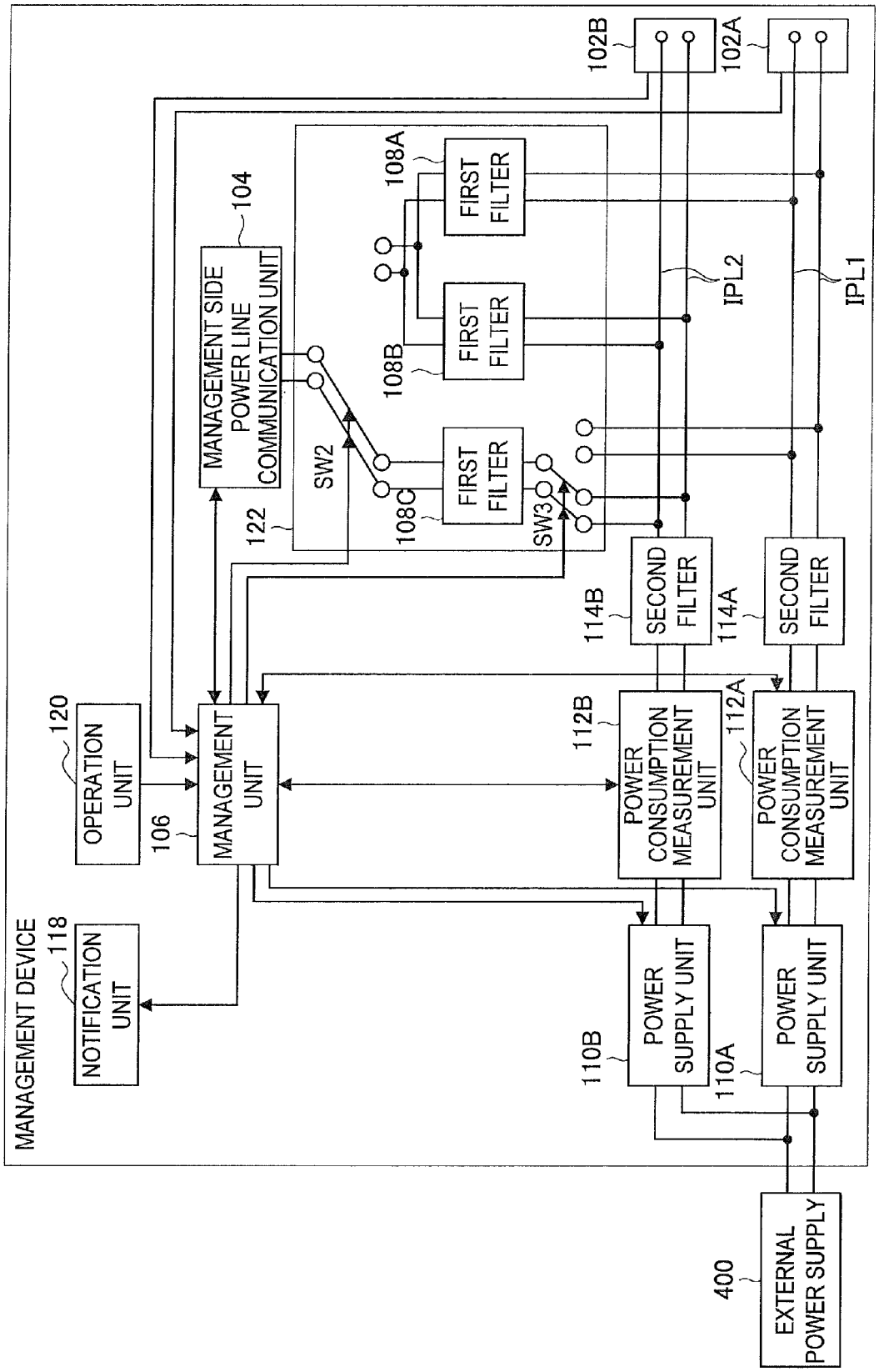
FIG. 12 is an illustration diagram illustrating an example of the configuration of a management device according to a fourth embodiment.

FIG. 12 is an illustration diagram illustrating an example of the configuration of a management device 100 according to the fourth embodiment. The management device 100 according to the fourth embodiment illustrated in FIG. 12 has substantially the same configuration as the management device 100 according to the third embodiment illustrated in FIG. 11. However, as compared to the management device 100 according to the third embodiment illustrated in FIG. 11, the management device 100 according to the fourth embodiment further includes a first filter 108C, a notification unit 118, an operation unit 120, and a switch unit 122.

Based on a control signal received from the management unit 106 (for example, a control unit indicating a notification command), the notification unit 118 notifies the user of the identification result of the electronic device 200 connected to the external power line EPL connected to each of a plurality of connection units 102A and 102B.

Figure 13:
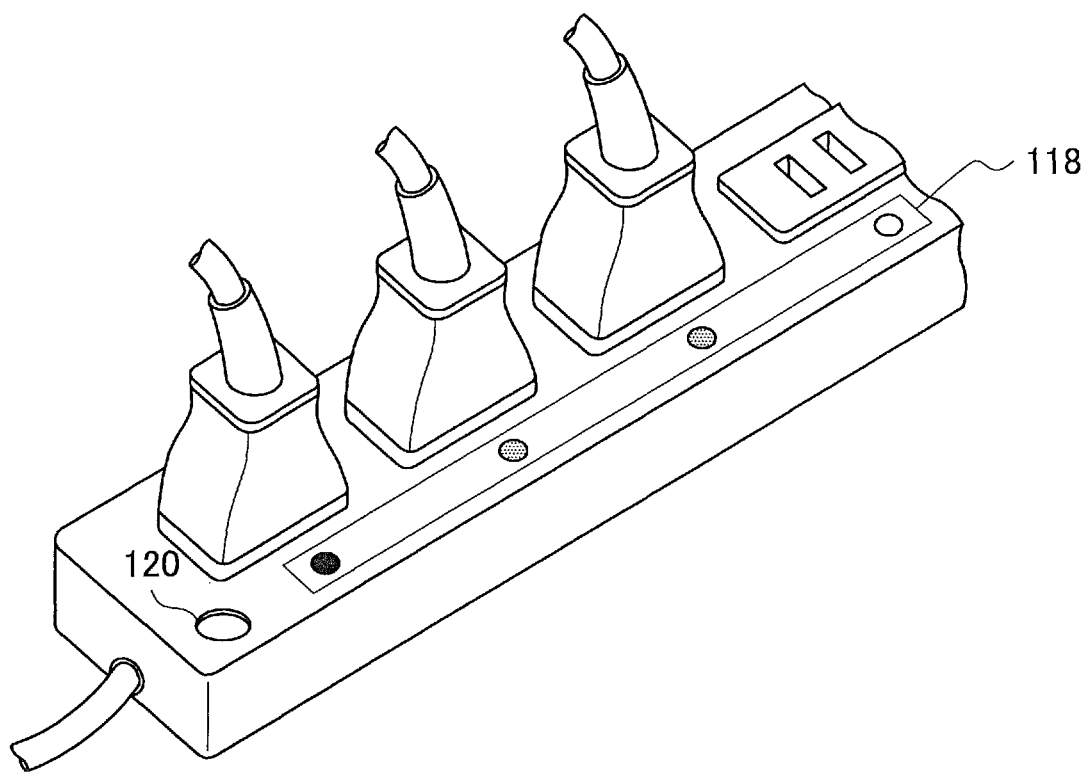
FIG. 13 is an illustration diagram illustrating an example of a notification unit and an operation unit according to the present embodiment.

FIG. 13 is an illustration diagram illustrating an example of the notification unit 118 and the operation unit 120 according to the present embodiment. Herein, FIG. 13 illustrates an exemplary case in which the notification unit 118 visually notifies of the identification result of the electronic device 200 connected to the external power line EPL connected to each of the connection units. As illustrated in FIG. 13, since the notification unit 118 visually notifies of the identification result of the electronic device 200 with respect to each connection unit (in FIG. 13, an oral portion of the outlet corresponds to the connection unit), the management device 100 can notify the user of the occurrence of the above problematic situation, even when the above problematic situation occurs in the management unit 106.

In addition, the notification unit 118 according to the present embodiment is not limited to the configuration of visually notifying of the identification result of the electronic device 200 as illustrated in FIG. 13. For example, the notification unit 118 may include a Digital Signal Processor (DSP) and an audio output device including an amplifier, speaker, or the like, to aurally notify of the identification result of the electronic device 200. Also, the notification unit 118 according to the present embodiment may be configured to perform notification, for example, by a combination of visual notification and aural notification.

Referring back to FIG. 12, the configuration of the management device 100 according to the fourth embodiment will be described. The operation unit 120 is an operation unit included in the management device 100, and enables operation by the user. For example, the operation unit 120 transmits, to the management unit 106, an operation signal corresponding to user operation for causing the management device 100 to perform communication with a plurality of electronic devices 200 sequentially (user operation for switching from a first connection state to a second connection state, which will be described later).

Herein, the operation unit 120 according to the present embodiment may be, for example, a button as illustrated in FIG. 13. However, the operation unit 120 according to the present embodiment is not limited thereto. For example, the operation unit 120 may be arrow keys, a rotary selector such as a jog dial, buttons, or a combination thereof. Also, the operation unit 120 according to the present embodiment may be attachable/detachable to/from the management device 100. Also, the management device 100 according to the present embodiment may perform a process based on, for example, an external operation signal received from an external operation device such as a keyboard, a mouse, a remote controller, or the like, without including the operation unit 120.

The switch unit 122 switches between the first connection state in which the management side power line communication unit 104 is electrically connected to the external power lines EPL connected to the plurality of connection units 102A and 102B and the second connection state in which the management side power line communication unit 104 is electrically connected to one of the external power lines ELP connected to the plurality of connection units 102A and 102B. Herein, the management device 100 performs communication with a plurality of connected electronic devices 200 in parallel in the first connection state, and performs communication with a plurality of electronic devices 200 sequentially in the second connection state.

More specifically, the switch unit 122 includes switches SW2 and SW3 for selectively changing a connection point based on a switch signal received from the management unit 106, and selectively switches between the first connection state and the second connection state based on the switch signal. Herein, the switch SW2 functions to switch between the first connection state and the second connection state, and the switch SW3 functions to determine one of the plurality of electronic devices 200 as a communication target in the second connection state.

When unable to identify "which electronic device 200 is connected to which connection unit through the external power line EPL," even based on connection state information, connection unit identification information, and identification information received from the management side power line communication unit 104 in the first connection state, the management unit 106 transmits a control signal for notification (for example, a control signal indicating a notification command) to the notification unit 118.

Also, the management unit 106 transmits a switch signal to the switch unit 122 based on, for example, an operation signal that is received from the operation unit 120 and corresponds to a user operation for switching from the first connection state to the second connection state. More specifically, when receiving the operation signal, the management unit 106 transmits a switch signal controlling the switch SW2 to switch to the second connection state, and transmits a first high frequency signal to the management side power line communication unit 104. Also, for example, when receiving the communication result from the management side power line communication unit 104, the management unit 106 switches the switch SW3 to a state for performing communication with another electronic device 200, and transmits the first high frequency signal to the management side power line communication unit 104. Herein, the communication result received from the management side power line communication unit 104 may be, for example, identification information acquired by the management side power line communication unit 104, a processing result indicating that there is no electronic device 200 as a communication target, or the like.

By transmitting the first high frequency signal to the management side power line communication unit 104 a number of times corresponding to the number of connection units included in the management unit 100, when the communication result is received from the management side power line communication unit 104, the management unit 106 performs the above process based on the connection state information, the connection unit identification information, and the identification information received from the management side power line communication unit 104. Then, when the connection state information after transmission of the first high frequency signal is stored, the management unit 106 transmits a switch signal to the switch unit 122 to switch from the second connection state to the first connection state.

As the management unit 106 controls the switch unit 122 and the management side power line communication unit 104 as above, the management device 100 according to the fourth embodiment can selectively communicate with a plurality of electronic devices 200 sequentially. Accordingly, even when the above problematic situation occurs, the management device 100 according to the fourth embodiment can overcome the above problematic situation and identify which electronic device 200 is connected to which connection unit through the external power line EPL.

Also, when the above problematic situation occurs, the management device 100 according to the fourth embodiment selectively switches from the first connection state to the second connection state. Therefore, the management device 100 according to the fourth embodiment can reduce the time taken to communicate with the plurality of electronic devices 200, as compared to the case of always communicating with the plurality of electronic devices 200 sequentially.

Also, the management device 100 according to the fourth embodiment has substantially the same configuration as the management device 100 according to the third embodiment illustrated in FIG. 3. Therefore, like the management device 100 according to the third embodiment, the management device 100 according to the fourth embodiment can implement the above-described process according to the present embodiment.

<Modified Example of Management Device 100 According to Fourth Embodiment>

In addition, the configuration of the management side power line communication unit 100 according to the fourth embodiment is not limited to the configuration illustrated in FIG. 12. For example, when unable to identify "which electronic device 200 is connected to which connection unit through the external power line EPL," even based on connection state information, connection unit identification information, and identification information received from the management side power line communication unit 104 in the first connection state, the management unit 106 according to the fourth embodiment may control the switch unit 122 and the management side power line communication unit 104 automatically regardless of an operation signal. Also, when the management unit 106 has the above function, the management device 100 according to a modified example of the fourth embodiment may not include the notification unit 118 and the operation unit 120.

Also, like the management device 100 according to the second embodiment illustrated in FIG. 10, the management device 100 according to the fourth embodiment may further include a communication unit 116.

As above, by using the communication method according to the present embodiment, the management system 1000 according to the present embodiment performs communication between the management device 100 and the electronic device 200 through the power line. The management device 100 acquires identification information from the electronic device 200 by communicating with the electronic device 200 through the power line as in the related art, and identifies the electronic device 200 connected by the power line based on the acquired identification information. Herein, the electronic device 200 is driven by the power obtained from the high frequency signal transmitted by the management device 100 in superimposition with the power line, and performs a response by load modulation. Accordingly, in the management system 1000, even when there is an electronic device 200 to which power is not supplied among the electronic devices 200 connected by the power lines, the management device 100 can identify the electronic device 200. Therefore, the management system 1000 can more securely identify the electronic device 200 connected by the power line, as compared to the related art in which an electronic device that is connected by a power line but to which power is not supplied cannot be recognized.

Also, in the management system 1000, since the electronic device 200 is driven by the power obtained from the high frequency signal transmitted by the management device 100 in superimposition with the power line and performs a response by load modulation, the electronic device 200 may not include a separate power supply circuit related to communication through the power line. Also, the electronic device 200 can perform communication with the management device 100 through the power line using a communication device having the same configuration as a communication device used in wireless communication technology such as NFC-based communication technology, RFID technology, or the like. Therefore, in the management system 1000, as compared to the case of using the related art in which communication is performed by the existing PLC, the size of devices related to communication can be easily reduced, and the costs thereof can be reduced.

In addition, since the communication through the power line in the management system 1000 is compatible with wireless communication technology such as NFC-based communication technology, RFID technology, or the like, it can use communication collision prevention technology (so-called anti-collision) of the wireless communication technology. Therefore, the management system 1000 can prevent the inability to identify the electronic device 200 connected by the power line even when power is supplied to the electronic device 200, which may occur when the related art in which communication is performed by the existing PLC is used.

Therefore, by including the management device 100 according to the present embodiment and the electronic device 200 according to the present embodiment, the management system 1000 can identify the electronic device connected by the power line.

Also, the management device 100 according to the present embodiment may have a function of communicating with the server 300 (external device). In this case, in the management system 1000, the management device 100 may transmit various information such as identification information and power consumption information to the server 300, and the server 300 may perform power management for the electronic device 200 connected to the management device 100. Also, in the above case, the management device 100 may perform various processes using data acquired from the server 300. Accordingly, for example, even when the identification information acquired from the electronic device 200 is data indicating a maker, a model number, or the like, which could not be identified by the management device 100, the management device 100 may identify the electronic device 200 using the data acquired from the server 300.

In addition, when the management device 100 has a function of communicating with the server 300 (external device), the management device 100 enables, for example, the electronic device 200 to perform a predetermined process in cooperation with the server 300, such as a charging process according to the amount of power supplied to the electronic device 200.

In the above, the management device 100 (corresponding to a reception device according to the present embodiment) is illustrated as a component constituting the management system 1000 according to the present embodiment (an example of the communication system according to the present embodiment). However, the present embodiment is not limited thereto. For example, the present embodiment can be applied to various devices such as a computer such as a Personal Computer (PC) or a server, a power tap, an Electric Vehicle (EV), a power feeder for supplying power to a device operated by power, a display device, or the like. Also, the present embodiments can be applied to a vehicle functioning as a power feeder.

Also, in the above, the electronic device 200 (corresponding to the transmission device according to the present embodiment) is illustrated as a component constituting the management system 1000 according to the present embodiment (an example of the communication system according to the present embodiment). However, the present embodiment is not limited thereto. For example, the present embodiment can be applied to various devices such as a computer such as a PC, a portable communication device such as a portable terminal or a Personal Handyphone System (PHS), an audio/music player (or video/music recording/reproducing device), a portable game machine, a display device, a television receiver, an illumination device, a toaster, a vehicle such as an Electric Vehicle (EV), or various devices operated by power.

Also, in the above, the server 300 is illustrated as a component constituting the management system 1000 according to the present embodiment (an example of the communication system according to the present embodiment). However, the present embodiment is not limited thereto. For example, the present embodiment can be applied to a computer such as a PC or a server, a computer group constituting a system based on network connection, such as cloud computing, or the like.

(Program According to Present Embodiment)
[Program Related to Management Device According to Present Embodiment]

Through a program for causing a computer to function as the management device according to the present embodiment (for example, a program for causing a computer to function as the management unit according to the present embodiment), the electronic device connected by the power line can be identified. Accordingly, by using the program for causing a computer to function as the management device according to the present embodiment, the management system capable of identifying the electronic device connected by the power line can be implemented.

[Program Related to Electronic Device According to Present Embodiment]

Through a program for causing a computer to function as the electronic device according to the present embodiment (for example, a program for causing a computer to function as the device side power line communication unit according to the present embodiment), communication with the management device according to the present embodiment can be performed through the power line. Accordingly, by using the program for causing a computer to function as the electronic device according to the present embodiment, the management system capable of identifying the electronic device connected by the power line can be implemented.

Also, according to the present embodiment, a program for functioning as the server according to the present embodiment can be provided.

The preferred embodiments of the present disclosure have been described above with reference to the accompanying drawings, whilst the present disclosure is not limited to the above examples, of course. A person skilled in the art may find various alternations and modifications within the scope of the appended claims, and it should be understood that they will naturally come under the technical scope of the present disclosure.

For example, although the management device 100 according to the first to fourth embodiments illustrated in FIGS. 3 and 10 to 12 (including the modified examples) is illustrated as being separated from the power communication unit 104 and the management unit 106, the configuration of the management device according to the present embodiment is not limited thereto. For example, in the management device according to the present embodiment, the power line communication unit 104 and the management unit 106 may be united into one unit (for example, one processing circuit).

Also, it has been illustrated above that the management unit of the management device 100 according to the present embodiment transmits the first high frequency signal to the management side power line communication unit when detecting a connection state change in the connection unit. However, the configuration of the management device according to the present embodiment is not limited thereto. For example, the management device according to the present embodiment may transmit the first high frequency signal to the management side power line communication unit periodically or aperiodically. Also, in the above case, the connection unit according to the present embodiment may not have a function of detecting a connection state change of the external power line.

Also, it has been illustrated above that the management device 100 according to the fourth embodiment has a configuration of selectively switching between the first connection state and the second connection state. However, the configuration of the management device 100 according to the present embodiment is not limited thereto. For example, the management device 100 may have a configuration of always performing communication in the second connection state. The management device having the above configuration has, for example, a switch unit corresponding to the switch unit 122 minus the switch SW2 illustrated in FIG. 12.

Also, it has been illustrated above that the management device 100 and the electronic device 200 according to the present embodiment perform communication using a high frequency signal having a higher frequency than the power supplied to the electronic device 200 through the power line. However, the frequency of a signal used in the communication according to the present embodiment is not limited thereto. For example, the management device and the electronic device according to the present embodiment may perform communication using a signal having a lower frequency than the frequency of the power, if only the signal used in the communication and the signal of the frequency of the power can be divided from each other.

Also, in the above-described management system 1000, the management device 100 and the electronic device 200 perform communication by superimposing the high frequency signal on the power line. However, a separate communication line may be provided in a cable including the power line, and the communication may be performed through the separate communication line.

In addition, it has been illustrated above that a program (computer program) for causing a computer to function as each of the management device, the electronic device and the server according to the present embodiment is provided. However, in the present embodiment, a recording medium storing the program may also be provided together with the program.

The above configurations are examples of the present embodiment, and will naturally come under the technical scope of the present disclosure.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

100 Management device
102, 102A, 102B Connection unit
104 Management side power line communication unit
106 Management unit
108, 108A, 108B, 108C, 202 First filter
110, 110A, 110B Power supply unit
112, 112A, 112B Power consumption measurement unit
114, 114A, 114B, 206 Second filter
116 Communication unit
118 Notification unit
120 Operation unit
200, 200A, 200B, 200C Electronic device
204 Device side power line communication unit
300 Server
400 External power supply
1000 Management system

The invention claimed is:

1. A transmission device comprising:
   a terminal of the transmission device configured to be electrically connected to a terminal of an electronic device via a power line; and
   a transmission unit that transmits information through the power line to the electronic device when the terminal of the transmission device is electrically connected to the terminal of the electronic device,
   wherein the transmission unit receives power from a high frequency signal transmitted from the electronic device via the power line and performs load modulation on the high frequency signal to communicate with the electronic device when the transmission device is electrically connected with the electronic device.

2. The transmission device according to claim 1, wherein the transmission unit is configured to transmit the information regardless of whether a signal indicating an instruction of a user is input after the contact is made between the terminal of the transmission device and the terminal of the electronic device.

3. The transmission device according to claim 1, further comprising a drive unit configured to drive by receiving a direct current or an alternating current having a frequency lower than the high frequency signal, wherein the drive unit is configured to receive the direct current or the alternating current according to a result of an authentication process executed in the electronic device by using the information.

4. The transmission device according to claim 1, wherein the high frequency signal is a frequency used in Radio Frequency IDentification (RFID).

5. The transmission device according to claim 4, wherein the high frequency includes a frequency used in contactless communication.

6. The transmission device according to claim 4, wherein the high frequency includes at least one of 130 to 135 kHz, 13.56 MHz, 56 MHz, 433 MHz, 954.2 MHz, 954.8 MHz, 2441.75 MHz, or 2448.875 MHz.

7. The transmission device according to claim 3, further comprising a filter configured to pass the high frequency signal and block the direct current or the alternating current.

8. The transmission device according to claim 1, wherein the transmission device includes at least two terminals, and the electronic device includes at least two terminals.

9. The transmission device according to claim 1, wherein the terminal of the transmission device is provided at a plug, and the terminal of the electronic device is provided at an outlet.

10. The transmission device according to claim 1, further comprising a display unit configured to display at least one of an image and a character.

11. The transmission device according to claim 1, wherein the transmission device is a vehicle that charges a built-in battery by receiving power supply, and rotates a wheel using power of the built-in battery.

12. A reception device comprising:
    to a terminal of the reception device configured to be electrically connected to a terminal of a transmission device via a power line;
    a high frequency signal output unit configured to output a high frequency signal via the power line to the transmission device; and
    a reception unit configured to receive information transmitted from the transmission device via the power line when the terminal of the transmission device and the terminal of the reception device are in contact with each other,
    wherein the reception unit receives the information based on load modulation of the high frequency signal when the reception device is electrically connected with the transmission device.

13. The reception device according to claim 12, wherein the high frequency signal is output when the contact between the terminal of the transmission device and the terminal of the reception device is detected.

14. The reception device according to claim 12, wherein the high frequency signal output unit is configured to output the high frequency signal repeatedly.

15. The reception device according to claim 12, wherein the high frequency signal output unit is configured to superimpose the high frequency signal, which is higher than a direct current or an alternating current flowing through the power line, on the direct current or the alternating current.

16. The reception device according to claim 12, wherein the high frequency signal is a frequency used in Radio Frequency IDentification (RFID).

17. The reception device according to claim 12, wherein the high frequency includes a frequency used in contactless communication.

18. The reception device according to claim 12, wherein the high frequency includes at least one of 130 to 135 kHz, 13.56 MHz, 56 MHz, 433 MHz, 954.2 MHz, 954.8 MHz, 2441.75 MHz, or 2448.875 MHz.

19. The reception device according to claim 12, further comprising a filter configured to pass the high frequency signal and block an alternating current.

20. The reception device according to claim 12, wherein the terminal of the transmission device is provided at a plug, and the terminal of the reception device is provided at an outlet.

21. The reception device according to claim 12, wherein the transmission device includes at least two terminals, and the reception device includes at least two terminals.

22. The reception device according to claim 12, wherein the transmission device is identified based on the information transmitted from the transmission device by the load modulation.

23. The reception device according to claim 12, further comprising a display unit configured to display at least one of an image and a character.

24. The reception device according to claim 12, wherein the reception device is a vehicle.

25. A communication system comprising:
a transmission device; and
a reception device,
wherein the transmission device includes
a terminal of the transmission device configured to be electrically connected to a terminal of the reception device via a power line, and
a transmission unit that transmits information through the power line to the reception device when the terminal of the transmission device is electrically connected to the terminal of the reception device,
wherein the reception device includes
the terminal of the reception device,
a high frequency signal output unit configured to output a high frequency signal via the power line to the transmission device, and
a reception unit configured to receive the information transmitted from the transmission device via the power line when the terminal of the transmission device and the terminal of the reception device are in contact with each other, and
wherein the transmission device receives power from the high frequency signal transmitted from the reception device via the power line and perform load modulation on the high frequency signal to communicate with the reception device, and the reception device receives the information based on load modulation of the high frequency signal when the transmission device is electrically connected with the reception device.

* * * * *